(12) United States Patent
Ikeda

(10) Patent No.: US 9,677,534 B2
(45) Date of Patent: Jun. 13, 2017

(54) INTERNAL COMBUSTION ENGINE

(75) Inventor: Yuji Ikeda, Kobe (JP)

(73) Assignee: IMAGINEERING, INC., Hyogo (JP)

( * ) Notice: Subject to any disclaimer, the term of this patent is extended or adjusted under 35 U.S.C. 154(b) by 698 days.

(21) Appl. No.: 14/006,056

(22) PCT Filed: Mar. 13, 2012

(86) PCT No.: PCT/JP2012/056356
§ 371 (c)(1),
(2), (4) Date: Oct. 23, 2013

(87) PCT Pub. No.: WO2012/124671
PCT Pub. Date: Sep. 20, 2012

(65) Prior Publication Data
US 2014/0299085 A1    Oct. 9, 2014

(30) Foreign Application Priority Data

Mar. 14, 2011  (JP) ................... 2011-056016
May 24, 2011  (JP) ................... 2011-115299
Aug. 10, 2011  (JP) ................... 2011-175441

(51) Int. Cl.
*F02M 27/04*   (2006.01)
*F02P 23/00*   (2006.01)
(Continued)

(52) U.S. Cl.
CPC .............. *F02P 23/045* (2013.01); *F02B 9/00* (2013.01); *F02B 23/08* (2013.01); *F02M 27/06* (2013.01);
(Continued)

(58) Field of Classification Search
CPC .......... H05H 1/04; H05H 1/00; H05H 1/0081; H05H 1/24; H05H 1/46; F02B 1/02;
(Continued)

(56) References Cited

U.S. PATENT DOCUMENTS 3,589,177 A * 6/1971 Merlo ................... G01M 15/10
                                                           324/384
6,059,922 A * 5/2000 Yamazaki ................ H05H 1/00
                                                          118/723 ME
(Continued)

FOREIGN PATENT DOCUMENTS

EP    2180172 A1    4/2010
EP    2450560 A1    5/2012
(Continued)

OTHER PUBLICATIONS

International Search Report of PCT/JP2012/056356, mailing date of Sep. 18, 2012.
(Continued)

*Primary Examiner* — Thomas Moulis
*Assistant Examiner* — George Jin
(74) *Attorney, Agent, or Firm* — Westerman, Hattori, Daniels & Adrian, LLP

(57) ABSTRACT

To reduce the amount of exhausted unburned fuel and further improve fuel efficiency of an internal combustion engine 10 provided with an ignition device 12 that ignites fuel air mixture more forcefully than a spark discharge in a combustion chamber 20. The internal combustion engine 10 includes an internal combustion engine main body 11 formed with the combustion chamber 20 and the ignition device 12 that ignites the fuel air mixture more forcefully than the spark discharge in the combustion chamber 20. In addition, the internal combustion engine 10 includes an electromagnetic wave emission device 13 that emits an electromagnetic wave supplied from an electromagnetic wave oscillator 32 from an antenna 41. The electromagnetic wave emission device 13 emits the electromagnetic wave from the antenna 41, thereby creating an electric field for accelerating a propagation speed of a flame.

18 Claims, 28 Drawing Sheets

(51) Int. Cl.
   *F02P 23/04* (2006.01)
   *F02B 9/00* (2006.01)
   *F02B 23/08* (2006.01)
   *F02M 27/06* (2006.01)
   *H05H 1/52* (2006.01)
   *F02P 9/00* (2006.01)
   *F02P 15/08* (2006.01)
   *H01T 13/08* (2006.01)
   *H01T 13/40* (2006.01)
   *F02D 41/22* (2006.01)
   *F02P 3/04* (2006.01)
   *F02P 7/02* (2006.01)
   *F02P 11/00* (2006.01)
   *F02P 15/04* (2006.01)

(52) U.S. Cl.
   CPC ............. *F02P 9/007* (2013.01); *F02P 15/08* (2013.01); *H05H 1/52* (2013.01); *F02D 41/221* (2013.01); *F02M 2027/047* (2013.01); *F02P 3/0407* (2013.01); *F02P 7/02* (2013.01); *F02P 11/00* (2013.01); *F02P 15/04* (2013.01); *H01T 13/08* (2013.01); *H01T 13/40* (2013.01); *Y02T 10/12* (2013.01); *Y02T 10/125* (2013.01)

(58) Field of Classification Search
   CPC .. F02B 9/00; F02B 19/12; F02B 23/08; F02B 2023/106; F02M 27/08; F02M 27/04; F02M 27/065; F02M 27/042; F02M 27/06; F02M 2027/047; F02P 9/007; F02P 15/08; F02P 23/04; F02P 23/045
   USPC ............. 123/143 B, 536, 149 F, 169 R, 620
   See application file for complete search history.

(56) References Cited

U.S. PATENT DOCUMENTS

| | | | | |
|---|---|---|---|---|
| 7,793,632 B2* | 9/2010 | Idogawa | ............... | F02P 23/045 123/143 B |
| 8,186,322 B2* | 5/2012 | Ikeda | .................... | B01D 53/32 123/143 B |
| 8,226,901 B2* | 7/2012 | Makita | .................... | F02P 3/01 123/143 B |
| 8,240,293 B2 | 8/2012 | Ikeda | | |
| 8,820,285 B2* | 9/2014 | Kaneko | ................... | F02P 9/007 123/143 B |
| 2006/0113181 A1* | 6/2006 | Hirata | ................ | B01D 53/9431 204/173 |
| 2009/0229581 A1 | 9/2009 | Ikeda | | |
| 2010/0186670 A1* | 7/2010 | Ikeda | ................ | H01J 37/32192 118/723 AN |
| 2010/0192909 A1* | 8/2010 | Ikeda | ..................... | F02D 41/402 123/436 |
| 2010/0196208 A1* | 8/2010 | Makita | ...................... | F02P 3/01 422/83 |
| 2010/0242899 A1* | 9/2010 | Hitomi | ................ | F02D 41/3035 123/299 |
| 2011/0025210 A1* | 2/2011 | Ikeda | ..................... | F02B 23/08 315/111.21 |
| 2011/0030660 A1* | 2/2011 | Ikeda | ....................... | F02B 1/02 123/536 |
| 2011/0031886 A1* | 2/2011 | Ikeda | ....................... | F01L 3/02 315/111.21 |
| 2014/0216381 A1* | 8/2014 | Ikeda | ..................... | H05H 1/46 123/143 B |
| 2014/0224204 A1* | 8/2014 | Ikeda | ....................... | F02P 3/01 123/169 R |
| 2014/0299085 A1* | 10/2014 | Ikeda | ....................... | F02B 9/00 123/143 B |
| 2015/0068479 A1* | 3/2015 | Ikeda | ....................... | F02P 3/01 123/143 B |

FOREIGN PATENT DOCUMENTS

| | | |
|---|---|---|
| JP | 2007-113570 A | 5/2007 |
| JP | 2009-103039 A | 5/2009 |
| JP | 2009-221948 A | 10/2009 |
| JP | 2010-037950 A | 2/2010 |
| JP | 2010-096112 A | 4/2010 |
| JP | 2011-007157 A | 1/2011 |
| JP | 2011-007162 A | 1/2011 |

OTHER PUBLICATIONS

International Preliminary Report on Patentability of PCT/JP2012/056356, issued Sep. 17, 2013.

* cited by examiner (a)

(b)

Flame Surface (c)

Flame Surface

INTERNAL COMBUSTION ENGINE

TECHNICAL FIELD

The present invention relates to an internal combustion engine that ignites fuel air mixture more forcefully than a spark discharge.

BACKGROUND ART

Conventionally, there is known an internal combustion engine that ignites fuel air mixture more forcefully than a spark discharge caused by momentary application of a high voltage pulse. With this kind of internal combustion engine, it is possible to stably ignite lean fuel air mixture in comparison with a case in which the fuel air mixture is ignited by the spark discharge. For example, Japanese Unexamined Patent Application, Publication No. 2010-96112 and Japanese Unexamined Patent Application, Publication No. 2011-7157 disclose internal combustion engines that ignite fuel air mixture by way of high intensity plasma.

Japanese Unexamined Patent Application, Publication No. 2010-96112 discloses a plasma ignition device that supplies a large current stored in a capacitor to an ignition plug immediately after application of a high voltage from an ignition coil. While, on the other hand, Japanese Unexamined Patent Application, Publication No. 2011-7157 discloses a spark ignition internal combustion engine that supplies a boosted alternating voltage to an ignition plug.

THE DISCLOSURE OF THE INVENTION

Problems to be Solved by the Invention

With a conventional internal combustion engine, it is possible to improve fuel efficiency by setting air fuel ratio of the fuel air mixture to a large value, and thus reducing pumping loss. However, as the fuel air mixture is made leaner, a propagation speed of a flame decreases, thereby resulting in the fact that a greater amount of unburned fuel is exhausted. Therefore, although fuel efficiency of the engine is improved owing to the reduction of pumping loss, the improvement of fuel efficiency is deteriorated to a degree by which the amount of unburned fuel is increased.

The present invention has been made in view of the above described circumstances, and it is an object of the present invention to reduce the amount of exhausted unburned fuel, thereby further improving fuel efficiency of an internal combustion engine including an ignition device that ignites fuel air mixture in a combustion chamber more forcefully than a spark discharge.

Means for Solving the Problems

In accordance with a first aspect of the present invention, there is provided an internal combustion engine including: an internal combustion engine main body formed with a combustion chamber; and an ignition device that ignites fuel air mixture in the combustion chamber more forcefully than a spark discharge, wherein the internal combustion engine repeatedly carries out a combustion cycle, in which the ignition device ignites the fuel air mixture so as to combust the fuel air mixture, the internal combustion engine is further provided with an electromagnetic wave emission device provided with an electromagnetic wave oscillator that oscillates an electromagnetic wave, and an antenna that emits the electromagnetic wave supplied from the electromagnetic wave oscillator to the combustion chamber, and the electromagnetic wave emission device emits the electromagnetic wave from the antenna so as to create an electric field for accelerating a propagation speed of a flame.

According to the first aspect of the present invention, an operation of igniting fuel air mixture (hereinafter, referred to as an "ignition operation") is performed more forcefully than the spark discharge. In accordance with the ignition operation, it is possible to stably ignite even lean fuel air mixture. Furthermore, according to the first aspect of the present invention, the propagation speed of the ignited flame is accelerated owing to the electric field created by the electromagnetic wave emitted from the antenna.

In accordance with a second aspect of the present invention, in addition to the first aspect of the present invention, the ignition device supplies a high frequency wave to the combustion chamber so as to generate a high intensity plasma, which is more intense than the spark discharge, and the electromagnetic wave oscillator outputs the electromagnetic wave higher in frequency than the high frequency wave supplied from the ignition device.

According to the second aspect of the present invention, the frequency of the electromagnetic wave for accelerating the propagation speed of the flame is higher than that of the high frequency wave outputted from the ignition device. For a purpose of accelerating the propagation speed of the flame in the combustion chamber, it is advantageous to use a high frequency electric wave in that it is possible to intensify an electric field in a region distant from an emission source of the electric wave. On the other hand, for a purpose of improving ignitability, it is advantageous to use a low frequency electric wave in that it is possible to reduce a size of an oscillator for the electric wave. According to the second aspect of the present invention, in view of the above described circumstances, the electromagnetic wave is configured to be higher in frequency than the high frequency wave outputted from the ignition device.

In accordance with a third aspect of the present invention, in addition to the second aspect of the present invention, the high frequency wave outputted from the ignition device is configured to have a frequency that can create an induction electric field in the combustion chamber, and the electromagnetic wave outputted from the electromagnetic wave oscillator is configured to have a frequency that can create a radiation electric field in the combustion chamber.

According to the third aspect of the present invention, the high frequency wave outputted from the ignition device creates the induction electric field in the combustion chamber, and the electromagnetic wave outputted from the electromagnetic wave oscillator creates the radiation electric field in the combustion chamber.

In accordance with a fourth aspect of the present invention, in addition to the first aspect of the present invention, the ignition device is provided with an ignition plug that includes an ignition side electrode exposed toward the combustion chamber, and a plasma generation part that supplies electric energy to the ignition side electrode, thereby generating high intensity plasma which is more intense than the spark discharge.

According to the fourth aspect of the present invention, during the ignition operation, the high intensity plasma is generated by electric energy supplied to the ignition side electrode of the ignition plug.

In accordance with a fifth aspect of the present invention, in addition to the fourth aspect of the present invention, the ignition device is provided with a high voltage pulse application part that causes the spark discharge by applying a high voltage pulse to the ignition side electrode, and is adapted to enlarge discharge plasma, which has been generated due to the spark discharge, by the electric energy outputted from the plasma generation part so as to generate the high intensity plasma.

According to the fifth aspect of the present invention, during the ignition operation, the discharge plasma generated by the high voltage pulse supplied from the high voltage pulse application part is supplied with the electric energy from the plasma generation part, thereby generating the high intensity plasma.

In accordance with a sixth aspect of the present invention, in addition to the fourth or fifth aspect of the present invention, a first transmission line for supplying the electric energy outputted from the plasma generation part to the ignition side electrode, and a second transmission line for supplying the electromagnetic wave outputted from the electromagnetic wave oscillator to the antenna are provided separately from each other.

According to the sixth aspect of the present invention, the second transmission line for electromagnetic wave is separately provided from the first transmission line for generating the high intensity plasma. In order to supply the high intensity plasma generated by the ignition device with energy of an electromagnetic wave, such a method is conceivable that the electromagnetic wave is emitted to the combustion chamber from the ignition side electrode of the ignition plug in order to effectively intensify the electric field at a location where the high intensity plasma is generated (hereinafter, referred to as a "plasma generation location"). In this case, a part of the first transmission line is used as a transmission line for electromagnetic wave, and the ignition side electrode serves as the antenna for electromagnetic wave as well.

However, if the electromagnetic wave is emitted from the ignition side electrode, energy is excessively concentrated at a tip end part of the ignition plug, which may be likely damaged. Furthermore, when the electromagnetic wave is emitted from the ignition side electrode, although ignitability is improved owing to concentration of energy in a region where the fuel air mixture is ignited, propagation property of the flame does not change so much. While on the other hand, according to the sixth aspect of the present invention, since the first transmission line and the second transmission line are provided separately from each other, it is possible to determine a location for emitting the electromagnetic wave regardless of a location of the ignition side electrode.

In accordance with a seventh aspect of the present invention, in addition to the sixth aspect of the present invention, the electromagnetic wave emission device emits the electromagnetic wave from the antenna while the high intensity plasma is present so as to supply the high intensity plasma with energy of the electromagnetic wave.

According to the seventh aspect of the present invention, the high intensity plasma generated by the ignition device expands upon receiving energy of the electromagnetic wave. The plasma expanded by the electromagnetic wave is, as whole, reduced in temperature in comparison with the same plasma that has not yet been expanded. As a result of this, the lifetime of active species such as OH radical is increased in comparison with the same plasma that has not yet been expanded. According to the seventh aspect of the present invention, the high intensity plasma generated by the ignition device is expanded by the electromagnetic wave, thereby allowing the active species generated in a plasma region to hardly disappear.

In accordance with an eighth aspect of the present invention, in addition to the seventh aspect of the present invention, the high intensity plasma generated by the ignition device is drifted by a gas flow in the combustion chamber, and the electromagnetic wave emission device forms a strong electric field region, which has an electric field relatively strong in intensity in the combustion chamber, at a location where the high intensity plasma, which has been drifted by the gas flow, is present.

According to the eighth aspect of the present invention, the strong electric field region is created at the location where the high intensity plasma, which has been drifted by the gas flow, is present. Accordingly, the high intensity plasma generated by the ignition device effectively absorbs the energy of the electromagnetic wave.

In accordance with a ninth aspect of the present invention, in addition to the seventh aspect of the present invention, the high intensity plasma generated by the ignition device is drifted by a gas flow in the combustion chamber, and the electromagnetic wave emission device forms a strong electric field region, which has an electric field relatively strong in intensity in the combustion chamber, in the vicinity of a location where the high intensity plasma, which has been drifted by the gas flow, is present.

According to the ninth aspect of the present invention, the strong electric field region is created in the vicinity of the location where the high intensity plasma, which has been drifted by the gas flow, is present. Accordingly, the high intensity plasma reacts with the electric field of the strong electric field region in the vicinity so as to absorb the energy of the electromagnetic wave.

In accordance with a tenth aspect of the present invention, in addition to the ninth aspect of the present invention, the electromagnetic wave emission device forms the strong electric field region on a downstream side in a direction which the high intensity plasma is drifted to.

According to the tenth aspect of the present invention, the strong electric field region is formed in the vicinity of the high intensity plasma on the downstream side in the direction which the high intensity plasma is drifted to. The high intensity plasma reacts with an electric field of the strong electric field region on a side opposite to the ignition plug.

In accordance with an eleventh aspect of the present invention, in addition to any one of the fourth to sixth aspects of the present invention, the electromagnetic wave emission device emits the electromagnetic wave from the antenna after the fuel air mixture is ignited, thereby creating an electric field for accelerating the propagation speed of the flame.

According to the eleventh aspect of the present invention, the electromagnetic wave is emitted from the antenna after the fuel air mixture is ignited, thereby creating the electric field for accelerating the propagation speed of the flame.

In accordance with a twelfth aspect of the present invention, in addition to the eleventh aspect of the present invention, the electromagnetic wave emission device emits the electromagnetic wave from the antenna after the fuel air mixture is ignited, thereby creating an electric field for attracting the flame in a propagation direction of the flame.

According to the twelfth aspect of the present invention, the electromagnetic wave emitted from the antenna creates the electric field for attracting the flame in the propagation direction of the flame. The flame is attracted in the propagation direction by the electric field created by the electromagnetic wave.

In accordance with a thirteenth aspect of the present invention, in addition to the twelfth aspect of the present invention, a cylindrical shaped cylinder partitions the combustion chamber and the ignition device ignites the fuel air mixture at a central part of the combustion chamber in the internal combustion engine main body, while the antenna is arranged on an outer peripheral side of the combustion chamber.

According to the thirteenth aspect of the present invention, the antenna is arranged on the outer peripheral side of the combustion chamber so as to create the electric field for attracting the flame in the propagation direction of the flame.

In accordance with a fourteenth aspect of the present invention, in addition to the eleventh aspect of the present invention, the internal combustion engine is provided with a voltage application part that applies a positive voltage or alternating voltage to the antenna while the antenna is emitting the electromagnetic wave.

According to the fourteenth aspect of the present invention, the positive voltage or alternating voltage is applied to the antenna while the antenna is emitting the electromagnetic wave. Accordingly, electrons and the like in the flame are attracted toward a side of the antenna.

In accordance with a fifteenth aspect of the present invention, in addition to any one of the fourth to fourteenth aspects of the present invention, the antenna is arranged in the vicinity of the ignition plug.

According to the fifteenth aspect of the present invention, the electromagnetic wave is emitted from the antenna in the vicinity of the ignition plug so as to create the electric field for accelerating the propagation speed of the flame.

In accordance with a sixteenth aspect of the present invention, in addition to the fifteenth aspect of the present invention, the antenna extends outwardly of and along an outer periphery of a tip end part of the ignition plug.

According to the sixteenth aspect of the present invention, the antenna in the vicinity of the ignition plug extends outwardly of and along the outer periphery of the tip end part of the ignition plug.

In accordance with a seventeenth aspect of the present invention, in addition to the sixteenth aspect of the present invention, the antenna is formed in a shape of a ring or a letter C.

According to the seventeenth aspect of the present invention, the antenna in the vicinity of the ignition plug is formed in the shape of the ring or the letter C.

In accordance with an eighteenth aspect of the present invention, in addition to any one of the fifteenth to seventeenth aspects of the present invention, the internal combustion engine is provided with an attraction electrode that is arranged on a side opposite to the ignition plug in relation to the antenna and is adapted to attract the electric field created by the electromagnetic wave emitted from the antenna toward the side opposite to the ignition plug.

According to the eighteenth aspect of the present invention, the electric field created by the electromagnetic wave emitted from the antenna is attracted toward the side opposite to the ignition plug by the attraction electrode. Accordingly, energy is prevented from being concentrated at the tip end part of the ignition plug that generates the high intensity plasma.

In accordance with a nineteenth aspect of the present invention, in addition to the sixth aspect of the present invention, the internal combustion engine is provided with a switchable transmission line for supplying the electromagnetic wave outputted from the electromagnetic wave oscillator to the ignition side electrode, and a switching unit that is switchable between an ordinary state, in which the electromagnetic wave outputted from the electromagnetic wave oscillator is supplied to the antenna via the second transmission line, and a switched state, in which the electromagnetic wave outputted from the electromagnetic wave oscillator is supplied to the ignition side electrode via the switchable transmission line.

According to the nineteenth aspect of the present invention, when the switching unit is set to the ordinary state, the electromagnetic wave is emitted from the antenna to the combustion chamber, thereby accelerating the propagation speed of the flame. On the other hand, when the switching unit is set to the switched state, the electromagnetic wave is emitted from the ignition side electrode to the combustion chamber, thereby improving ignitability. According to the nineteenth aspect of the present invention, an emission destination of the electromagnetic wave outputted from the electromagnetic wave oscillator is switchable.

In accordance with a twentieth aspect of the present invention, in addition to the nineteenth aspect of the present invention, the internal combustion engine is provided with a failure detection unit that detects a failure in a generation operation in which the plasma generation part generates the high intensity plasma, and a control unit that, in a case in which the failure detection unit has detected a failure in the generation operation, causes the electromagnetic wave oscillator to output the electromagnetic wave at an ignition timing of igniting the fuel air mixture, and causes the switching unit to be set to the switched state at the ignition timing.

According to the twentieth aspect of the present invention, in a case in which the plasma generation part has a failure in the generation operation of generating the high intensity plasma, the electromagnetic wave outputted from the electromagnetic wave oscillator is emitted from the ignition side electrode to the combustion chamber at the ignition timing. The ignition side electrode is supplied with the electric energy outputted from the electromagnetic wave oscillator in place of the plasma generation part.

In accordance with a twenty first aspect of the present invention, in addition to the nineteenth aspect of the present invention, the electromagnetic wave emission device causes the electromagnetic wave oscillator to output the electromagnetic wave at the ignition timing of igniting the fuel air mixture and during a propagation period of the flame for each combustion cycle in the combustion chamber, and the switching unit is set to the switched state at the ignition timing, and then is set to the ordinary state during the propagation period of the flame for each combustion cycle in the combustion chamber.

According to the twenty first aspect of the present invention, the electromagnetic wave is supplied to the ignition side electrode at the ignition timing, and to the antenna during the propagation period of the flame after the ignition timing for each combustion cycle in the combustion chamber.

In accordance with a twenty second aspect of the present invention, in addition to the fifth aspect of the present invention, the internal combustion engine is provided with a control unit that sets the high frequency wave outputted from the ignition device to have a frequency that can create an induction electric field in the combustion chamber, sets the electromagnetic wave outputted from the electromagnetic wave oscillator to have a frequency that can create a radiation electric field in the combustion chamber, and causes the electric energy outputted from the plasma generation part to be supplied to the ignition side electrode of the ignition device, and while, on the other hand, if a gas flow rate of the intake port connected to the combustion chamber exceeds a predetermined flow rate, causes the electromagnetic wave emission device to emit the electromagnetic wave from the antenna at a timing when the ignition device ignites the fuel air mixture.

According to the twenty second aspect of the present invention, if the gas flow rate of the intake port exceeds the predetermined flow rate, the electromagnetic wave is emitted from the antenna to the combustion chamber when the fuel air mixture is ignited. Here, as the gas flow rate of the intake port increases, a speed of the gas flow in the combustion chamber increases, and the discharge plasma (flame kernel) generated by the spark discharge is drifted further away. This means that the discharge plasma becomes distant from the ignition side electrode which the high voltage pulse is supplied to. Since the high frequency wave having a frequency to create the induction electric field can supply energy merely to the vicinity of the ignition side electrode, it has been difficult to supply energy to the discharge plasma if the discharge plasma is placed distant from the ignition side electrode. While, on the other hand, according to the twenty second aspect of the present invention, the electromagnetic wave to create the radiation electric field is emitted to the discharge plasma. The discharge plasma is expanded by the electromagnetic wave.

Effect of the Invention

According to the present invention, lean fuel air mixture can be stably ignited. In addition, it is possible to accelerate the propagation speed of the flame byway of the electromagnetic wave emitted from the antenna. Accordingly, in a case in which the lean fuel air mixture is combusted in the combustion chamber, the amount of exhausted unburned fuel is reduced, and therefore, it is possible to improve fuel efficiency of the internal combustion engine.

Furthermore, according to the second aspect of the present invention, since it is advantageous to employ an electric wave of high frequency in creating the electric field for accelerating the propagation speed of the flame, the electromagnetic wave oscillated by the electromagnetic wave oscillator is configured to be higher in frequency than the high frequency wave outputted from the ignition device. Accordingly, it is possible to effectively accelerate the propagation speed of the flame.

Furthermore, according to the sixth aspect of the present invention, since the first transmission line and the second transmission line are separated from each other, it is possible to determine the location for emitting the electromagnetic wave regardless of the location of the ignition side electrode. Therefore, the antenna can be placed at any location as appropriate, and thus, it is possible to prevent energy from being concentrated at the tip end part of the ignition plug. Furthermore, it is possible to create the electric field which is effective in accelerating the propagation speed of the flame. Accordingly, it is possible to prevent the ignition plug from being damaged while accelerating the propagation speed of the flame as well.

Furthermore, according to the seventh aspect of the present invention, the high intensity plasma generated by the ignition device is expanded by way of the electromagnetic wave, thereby making it difficult for the active species generated by the plasma to be extinguished. Various types of active species become present in the combustion chamber in comparison with a case in which the electromagnetic wave is not emitted. As a result of this, a chemical reaction (oxidation reaction) of the fuel air mixture is promoted. According to the seventh aspect of the present invention, it is possible to effectively accelerate the propagation speed of the flame by way of the active species.

Furthermore, according to the eighth to tenth aspects of the present invention, since the strong electric field region is formed at or in the vicinity of the location where the high intensity plasma, which has been drifted by the gas flow, is present, the high intensity plasma can effectively absorb the energy of the electromagnetic wave. Accordingly, in comparison with a conventional internal combustion engine that is not configured in view of the fact that the high intensity plasma may be drifted, it is possible to increase the energy of the electromagnetic wave absorbed by the high intensity plasma.

Furthermore, according to the twelfth aspect of the present invention, since the flame is attracted in the propagation direction by the electric field created by the electromagnetic wave, it is possible to effectively accelerate the propagation speed of the flame.

Furthermore, according to the fourteenth aspect of the present invention, the positive voltage or alternating voltage is applied to the antenna while the antenna is emitting the electromagnetic wave, electrons and the like in the flame are attracted toward the side of the antenna. Accordingly, it is possible to effectively accelerate the propagation speed of the flame.

Furthermore, according to the eighteenth aspect of the present invention, since the electric field created by the electromagnetic wave emitted from the antenna is attracted by the attraction electrode toward the side opposite to the ignition plug, energy is prevented from being concentrated at the tip end part of the ignition plug that generates the high intensity plasma. Accordingly, it is possible to prevent the ignition plug from being damaged.

Furthermore, according to the nineteenth aspect of the present invention, since the emission destination of the electromagnetic wave outputted from the electromagnetic wave oscillator is switchable, it is possible to switch the emission destination of the electromagnetic wave in accordance with, for example, an operating condition of the internal combustion engine.

Furthermore, according to the twentieth aspect of the present invention, in a case in which the plasma generation part has a failure in the generation operation of generating the high intensity plasma, it is possible to generate the high intensity plasma by way of the electric energy outputted from the electromagnetic wave oscillator in place of the plasma generation part. Accordingly, it is possible to prevent ignitability from being deteriorated owing to the failure of the plasma generation part.

Furthermore, according to the twenty first aspect of the present invention, for each combustion cycle in the combustion chamber, the electromagnetic wave is supplied to the ignition side electrode at the ignition timing, and the electromagnetic wave is supplied to the antenna during the propagation period of the flame after the ignition timing. According to the twenty first aspect of the present invention, it is possible to promote the propagation of the flame by way of the electromagnetic wave, and to improve ignitability of the fuel air mixture as well.

Furthermore, according to the twenty second aspect of the present invention, in a case in which the discharge plasma is distant from the ignition side electrode under the operating condition in which the gas flow is strong, the electromagnetic wave is emitted in order to expand the discharge plasma. As a result of this, it is possible to ignite the fuel air mixture by the high intensity plasma under the operating condition in which the gas flow is strong.

BEST MODE FOR CARRYING OUT THE INVENTION

Figure 1:
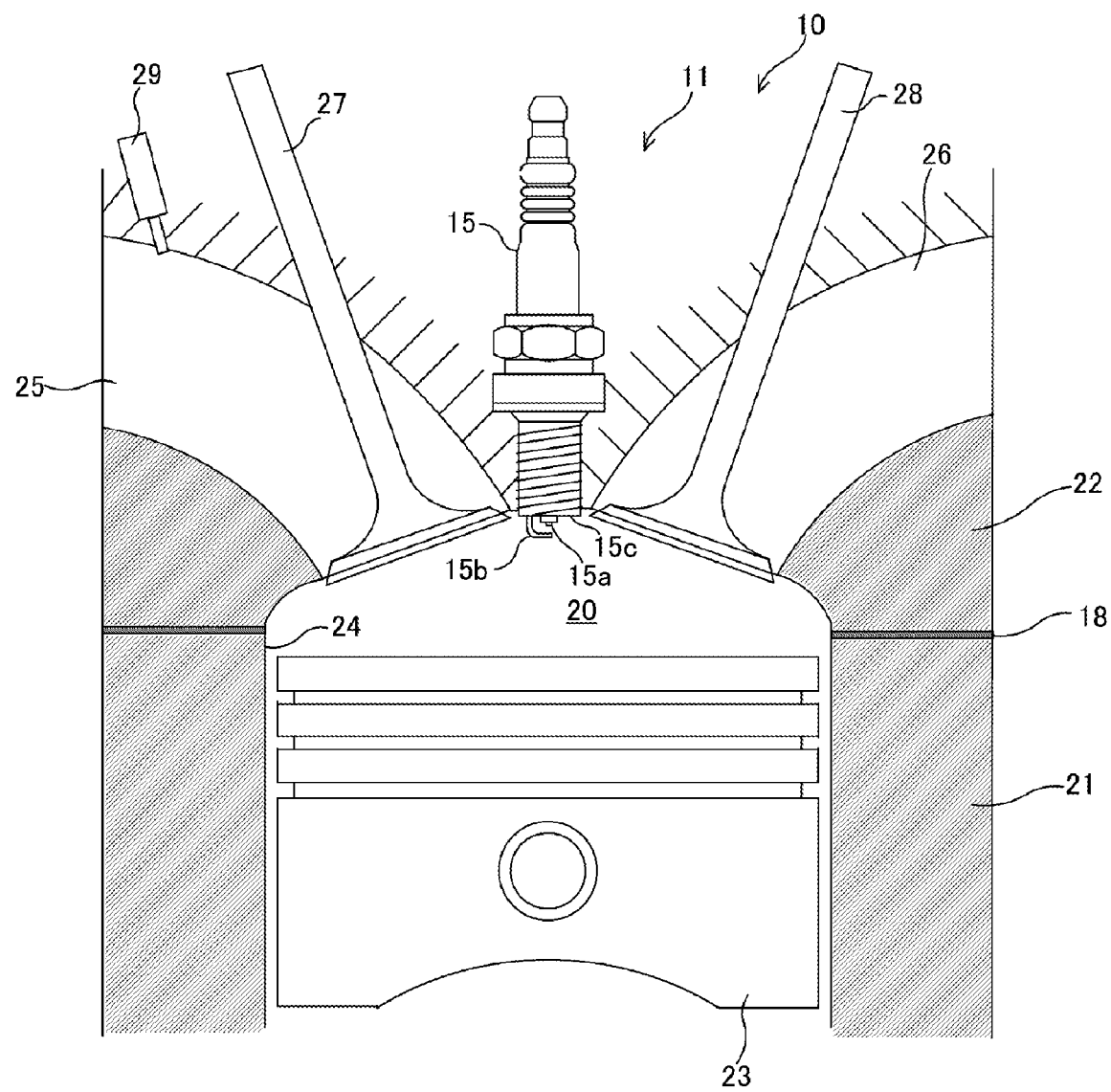
FIG. 1 is a schematic configuration diagram of an internal combustion engine according to an embodiment.

In the following, a detailed description will be given of the embodiment of the present invention with reference to drawings. It should be noted that the following embodiment is a mere example that is essentially preferable, and is not intended to limit the scope of the present invention, applied field thereof, or application thereof.

Embodiment

The present embodiment is directed to an example of an internal combustion engine 10 according to the present invention. The internal combustion engine 10 is a reciprocating type engine in which a piston 23 reciprocates. The internal combustion engine 10 is provided with an internal combustion engine main body 11, an ignition device 12, and an electromagnetic wave emission device 13. The internal combustion engine 10 repeatedly carries out a combustion cycle of igniting a fuel air mixture by the ignition device 12 and combusting the fuel air mixture.

The internal combustion engine main body 11 is formed with a combustion chamber 20. The ignition device 12 performs the ignition operation of igniting fuel air mixture by generating high intensity plasma 36 (volume plasma), which is more intense than a spark discharge (extremely thin non-volume plasma). The electromagnetic wave emission device 13 is provided with an electromagnetic wave oscillator 32 that oscillates a gigahertz band microwave (for example, a microwave of 2.45 GHz), and antennae 41 to 43 for emitting the microwave supplied from the electromagnetic wave oscillator 32 to the combustion chamber 20. The electromagnetic wave emission device 13 causes the antennae 41 to 43 to emit the microwave, thereby creating respective electric fields for accelerating the propagation speed of the flame. During the ignition operation, the internal combustion engine 10 drives the electromagnetic wave oscillator 32 to allow the antenna 41 to emit the microwave so as to supply energy of the microwave to the high intensity plasma 36 generated by the ignition device 12. Here, the internal combustion engine 10 is controlled by an electronic control device 30 (ECU).

<Internal Combustion Engine Main Body>

As shown in FIG. 1, the internal combustion engine main body 11 is provided with a cylinder block 21, a cylinder head 22, and the pistons 23. The cylinder block 21 is formed with a plurality of cylinders 24 each having a circular cross section. Inside of each cylinder 24, the piston 23 is reciprocatably mounted. The piston 23 is connected to a crankshaft (not shown) via a connecting rod (not shown). The crankshaft is rotatably supported by the cylinder block 21. While a piston 23 reciprocates in each cylinder 24 in an axial direction of the cylinder 24, the connecting rod converts the reciprocation movement of the piston 23 into rotation movement of the crankshaft.

The cylinder head 22 is placed on the cylinder block 21, and a gasket 18 intervenes between the cylinder block 21 and the cylinder head 22. The cylinder head 22 forms the combustion chamber 20 having a circular cross section along with the cylinder 24 and the piston 23. A diameter of the combustion chamber 20 is equal to, for example, approximately a half wavelength of the microwave emitted from the electromagnetic wave emission device 13.

The cylinder head 22 is provided with one ignition plug 15, which constitutes a part of the ignition device 12, for each cylinder 24. The ignition plug 15 has a tip end part 15c, which is exposed to the combustion chamber 20, located at a central part of a ceiling surface of the combustion chamber 20 (a surface of the cylinder head 22 exposed to the combustion chamber 20). An outer periphery of the tip end part 15c of the ignition plug 15 has a circular shape, seen from an axial direction thereof. The tip end part 15c of the ignition plug 15 is provided with a central electrode 15a (an ignition side electrode) and a ground electrode 15b. The ground electrode 15b is formed in a shape of a plate. The ground electrode 15b is protruded in the axial direction of the ignition plug 15 and sharply bent toward inside of the ignition plug 15 to face toward a tip end of the central electrode 15a. The ground electrode 15b of a base end side with respect to a bending position constitutes a base end part, and the ground electrode 15b of a tip end side with respect to the bending position constitutes a tip end part. A discharge gap is formed between the tip end part of the ground electrode 15b and the tip end of the central electrode 15a.

The cylinder head 22 is formed with an intake port 25 and an exhaust port 26 for each cylinder 24. The intake port 25 is provided with an intake valve 27 for opening and closing the intake port 25, and an injector 29 for injecting fuel. On the other hand, the exhaust port 26 is provided with an exhaust valve 28 for opening and closing the exhaust port 26.

The internal combustion engine 10 is designed such that the intake port 25 produces a strong tumble flow 35 in the combustion chamber 20. The tumble flow 35A is a gas flow 35 produced in the internal combustion engine 10. In the combustion chamber 20, a fuel air mixture that has flowed in from the intake port 25 flows toward a side of the exhaust port 26 along a ceiling surface of the combustion chamber 20, and the flow lashes against a wall surface of the cylinder 24 and a top surface of the piston 23 so as to make a vortex rotating in a vertical direction. The tumble flow 35 is produced during an intake stroke and a compression stroke.

<Ignition Device>

Figure 2:
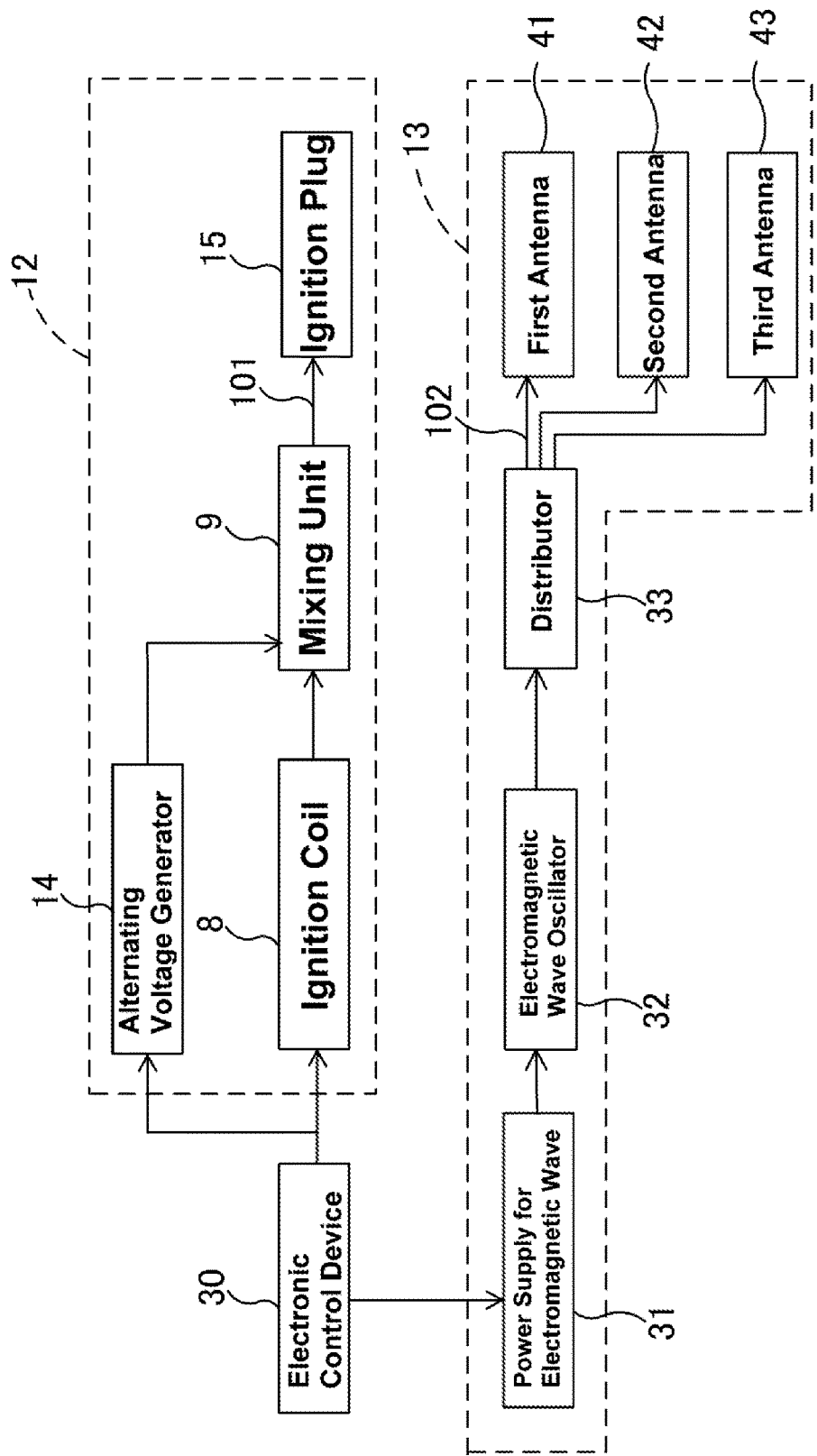
FIG. 2 is a block diagram of an ignition device and an electromagnetic wave emission device according to the embodiment.

The ignition device 12 is provided in association with each combustion chamber 20. The ignition device 12 supplies a high frequency wave to the combustion chamber 20 so as to generate the high intensity plasma 36, which is more intense than the spark discharge. As shown in FIG. 2, the ignition device 12 includes an ignition coil 8 that outputs a high voltage pulse, an alternating voltage generator 14 that outputs an alternating wave of a kilohertz band to megahertz band frequency (for example, a high frequency wave of 100 MHz), a mixing unit 9 that mixes the high voltage pulse outputted from the ignition coil 8 and the alternating wave outputted from the alternating voltage generator 14, and the ignition plug 15 supplied with the high voltage pulse and the alternating wave outputted from the mixing unit 9. The ignition device 12, upon receiving an ignition signal from the electronic control unit 30, performs the ignition operation.

The ignition coil 8 constitutes a high voltage pulse application part that causes the spark discharge at the discharge gap between the central electrode 15a and the ground electrode 15b by applying the high voltage pulse to the central electrode 15a. The alternating voltage generator 14 constitutes a plasma generation part that supplies electric energy to the central electrode 15a so as to expand the discharge plasma generated as a result of the spark discharge, thereby generating the high intensity plasma 36.

In the ignition device 12, the ignition coil 8 and the mixing unit 9 may be omitted. In this case, an output voltage and an output time period of the alternating wave from the alternating voltage generator 14 are configured so that the high intensity plasma 36, which is more intense than the spark discharge, can be generated.

A frequency of the alternating wave outputted from the alternating voltage generator 14 is configured so that an induction electric field can be created in the combustion chamber 20. On the other hand, a frequency of the microwave oscillated by the electromagnetic wave oscillator 32 is configured so that a radiation electric field can be created in the combustion chamber 20. A frequency of the alternating wave is lower than that of the microwave outputted from the electromagnetic wave oscillator 32.

The ignition coil 8 and the alternating voltage generator 14 are connected to a direct current power supply, for example, a battery of a vehicle (not shown). The ignition coil 8, upon receiving the ignition signal from the electronic control unit 30, boosts a voltage applied from the direct current power supply, and outputs the boosted high voltage pulse to the mixing unit 9. The alternating voltage generator 14, upon receiving the ignition signal from the electronic control unit 30, boosts a voltage applied from the direct current power supply, converts it into an alternating wave, and outputs the high voltage alternating wave to the mixing unit 9. The alternating voltage generator 14 outputs the high voltage alternating wave at the same time as the ignition coil 8 outputs the high voltage pulse. The mixing unit 9 receives the high voltage pulse and the alternating wave separately from respective input terminals, and outputs them from one and the same output terminal to the central electrode 15a of the ignition plug 15. The ignition plug 15, upon application of the high voltage pulse and the high voltage alternating wave to the central electrode 15a, causes the spark discharge to occur at the discharge gap byway of the high voltage pulse, while creating an electric field at the discharge gap by way of the high voltage alternating wave. The discharge plasma generated by the spark discharge receives electric energy of the alternating wave and expands so as to make the high intensity plasma 36. This means that, in a region where the spark discharge occurs, the high intensity plasma 36 is generated as a result of reaction between the spark discharge and the electric field. The high intensity plasma 36 is thermal plasma.

Although, according to the present embodiment, the alternating wave is applied to the central electrode 15a of the ignition plug 15, the high intensity plasma may be generated in such a manner that a voltage (CV voltage) is continuously applied to the central electrode 15a of the ignition plug 15 for a predetermined period of time. In any case, an amount of the electric energy supplied to the ignition plug 15 for each ignition operation is configured so that the high intensity plasma 36 should not disappear despite the strong tumble flow 35.

Figure 3:
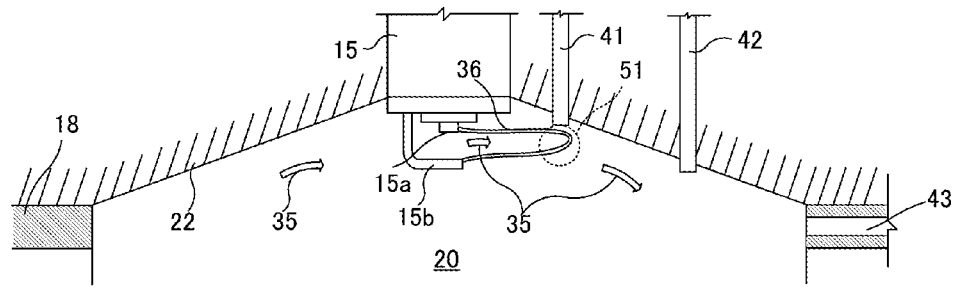
FIG. 3 is schematic configuration diagrams of a relevant part of the internal combustion engine according to the embodiment, FIG. 3A showing a first antenna emitting a microwave, FIG. 3B showing a second antenna emitting a microwave, and FIG. 3C showing a third antenna emitting a microwave.
Figure 3:
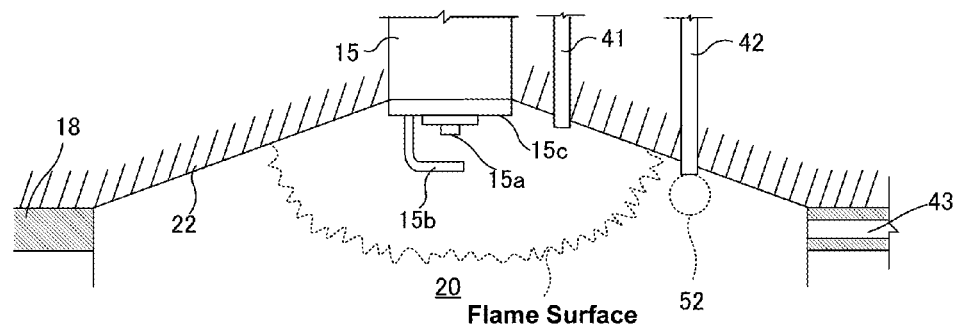
Figure 3:
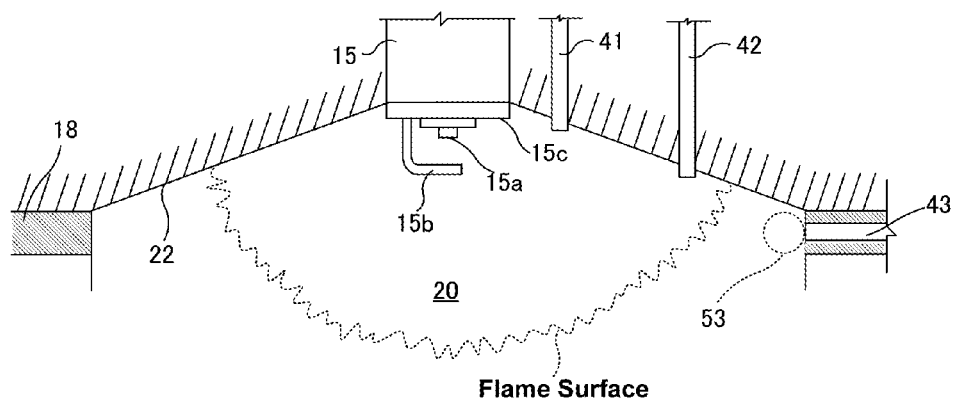

As described above, in the combustion chamber 20, the strong tumble flow 35 is produced during the intake stroke and the compression stroke, as shown in FIG. 3. At an ignition timing, when the piston 23 locates immediately before the compression top dead center, a bulk flow of the fuel air mixture at the discharge gap flows from a side of the intake port 25 to the side of the exhaust port 26 under influence of the tumble flow 35. As a result of this, the high intensity plasma 36 is drifted toward the side of the exhaust port 26. Accordingly, the high intensity plasma 36 is extended by the gas flow 35.

Figure 4:
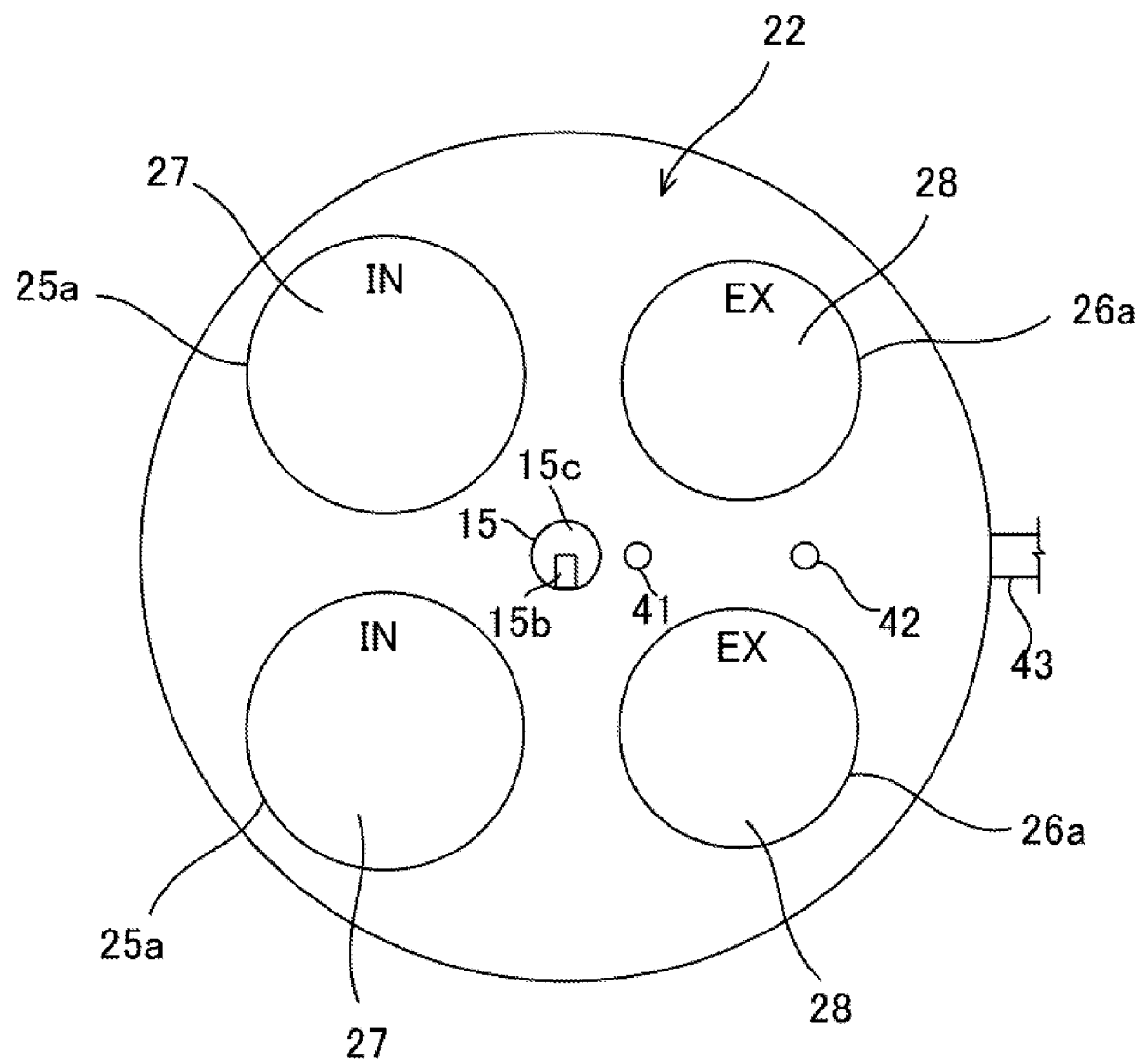
FIG. 4 is a front view of a ceiling surface of a combustion chamber of the internal combustion engine according to the embodiment.

According to the present embodiment, as shown in FIG. 4, the base end part of the ground electrode 15b locates on a side of a region between an opening part 25a of the intake port 25 and an opening part 26a of the exhaust port 26. As a result of this, the gas flow at the discharge gap is not disturbed by the base end part. Therefore, the high intensity plasma 36 can be easily drifted toward a region between the opening parts 26a of the two exhaust ports 26. The high intensity plasma 36 can be easily drifted by the tumble flow 35 toward a side of a first antenna 41, which will be described later.

<Electromagnetic Wave Emission Device>

As shown in FIG. 2, the electromagnetic wave emission device 13 includes a power supply for electromagnetic wave 31, an electromagnetic wave oscillator 32, a distributor 33, and a plurality of antennae 41 to 43. According to the present embodiment, three antennae 41 to 43 are provided for each combustion chamber 20. The electromagnetic wave emission device 13 includes a second transmission line 102 for supplying the microwave oscillated by the electromagnetic wave oscillator 32 to the antennae 41 to 43, which is separated from a first transmission line 101 for applying the alternating wave from the alternating voltage generator 14 to the central electrode 15a of the ignition plug 15. The first transmission line and the second transmission line are separated from each other. FIG. 2 shows only the antennae 41 to 43 corresponding to one combustion chamber 20.

The power supply for electromagnetic wave 31, upon receiving an electromagnetic wave drive signal from the electronic control device 30, supplies a pulse current to the electromagnetic wave oscillator 32. The electromagnetic wave drive signal is a pulse signal. The power supply for electromagnetic wave 31 repeatedly outputs the pulse current at a predetermined duty cycle during a period starting from a rising timing of the electromagnetic wave drive signal until a falling timing thereof. The pulse current is repeatedly outputted during a time period of a pulse width of the electromagnetic wave drive signal.

The electromagnetic wave oscillator 32 is, for example, a semiconductor oscillator. The electromagnetic wave oscillator 32, upon receiving the pulse current, outputs a microwave pulse. The electromagnetic wave oscillator 32 repeatedly outputs the microwave pulse during the time period of the pulse width of the electromagnetic wave drive signal. In place of the semiconductor oscillator, other types of oscillators such as a magnetron may be employed as the electromagnetic wave oscillator 32.

The distributor 33 switches the antenna to be supplied with the microwave outputted from the electromagnetic wave oscillator 32, from among the three antennae 41 to 43. This means that the distributor 33, upon receiving a distribution signal from the electronic control device 30, supplies the microwave to the three antennae 41 to 43 one after another in turn.

As shown in FIG. 3, the three antennae 41 to 43 consist of the first antenna 41, a second antenna 42, and a third antenna 43, in the order from the side of the ignition plug 15. Each of the antennae 41 to 43 is formed in a shape of a rod. A tip end of each of the antennae 41 to 43 corresponds to an emitting position (radiating position) of the microwave.

The first and second antennae 41 and 42 are embedded in the cylinder head 22. The first and second antennae 41 and 42 are electrically insulated from the cylinder head 22 by means of insulating members (not shown). Emitting ends for microwave (tip ends) of the first and second antennae 41 and 42 are slightly protruded from the ceiling surface of the combustion chamber 20. As shown in FIG. 4, the first and second antennae 41 and 42 are aligned along a radial direction of the combustion chamber 20 in the region between the opening parts 26a of the two exhaust ports 26. The first antenna 41 is arranged in the vicinity of the ignition plug 15. The second antenna 42 is arranged in the vicinity of a middle position between the ignition plug 15 and the wall surface of the cylinder 24.

The third antenna 43 is embedded in the gasket 18, and provided with an emitting end for microwave, which is approximately flush with an inner periphery of the gasket 18. The third antenna 43 is electrically insulated from the cylinder head 22 by the gasket 18.

An input end (a base end) of each of the antennae 41 to 43 is connected to the distributor 33. From the emitting end of each of the antennae 41 to 43, the microwave supplied from the distributor 33 is emitted to the combustion chamber 20.

According to the present embodiment, during the ignition operation, the microwave is emitted from the first antenna 41. The first antenna 41 is arranged so that a strong electric field region 51, which has an electric field relatively strong in intensity in the combustion chamber 20, is formed at a location different from the plasma generation location in the vicinity of the central electrode 15a of the ignition plug 15. The first antenna 41 is arranged so that a strong electric field region 51 is formed at a location where the high intensity plasma 36, which has been drifted by the tumble flow 35, is present.

More particularly, the emitting end of the first antenna 41 is located downstream of the discharge gap in a direction of the gas flow at the discharge gap so that the high intensity plasma 36 that has been drifted due to the tumble flow 35 is irradiated with the microwave during the ignition operation. The emitting end of the first antenna 41 is located in the vicinity of the ignition plug 15 on the ceiling surface of the combustion chamber 20. The emitting end of the first antenna 41 faces toward a flexure part of the high intensity plasma 36 (a part that has been drifted furthest away by the tumble flow 35), which is located at a position most distant from the discharge gap. The emitting end of the first antenna 41 faces toward the high intensity plasma 36 throughout an entire operating range of emitting the microwave during the ignition operation.

According to the present embodiment, the second and third antennae 42 and 43 are disposed on the same side as the first antenna 41 in relation to the ignition plug 15. However, the second and third antennae 42 and 43 may be disposed on a side opposite to the first antenna 41 in relation to the ignition plug 15 (a left side of the ignition plug 15, in FIG. 4).

<Ignition Operation>

The ignition operation of the fuel air mixture performed by the ignition device 12 and an emission operation by the electromagnetic wave emission device 13 during the ignition operation will be described hereinafter.

In the internal combustion engine 10, the ignition timing when the piston 23 is located immediately before the compression top dead center is employed as the discharge timing. At the ignition timing, the ignition device 12 performs the ignition operation of generating of generating the high intensity plasma 36, thereby igniting the fuel air mixture. At the same time, while the high intensity plasma 36 is present, the electromagnetic wave emission device 13 performs the emission operation of emitting the microwave so as to supply the high intensity plasma 36 with the energy of the microwave.

During the above described series of operations, the electronic control unit 30 outputs the ignition signal and the electromagnetic wave drive signal. Then, in the ignition device 12, the ignition coil 8 that has received the ignition signal outputs the high voltage pulse, while the alternating voltage generator 14 that has received the ignition signal outputs the alternating wave. Then, as described above, the high voltage pulse and the alternating wave are applied to the ignition plug 15 so as to generate the high intensity plasma 36 at the discharge gap of the ignition plug 15. The plasma generation location is located at the discharge gap. The high intensity plasma 36 is sustained during a period of application of the alternating wave. The lean fuel air mixture in the combustion chamber 20 is forcefully ignited by the high intensity plasma 36.

On the other hand, in the electromagnetic wave emission device 13, the power supply for electromagnetic wave 31 that has received the electromagnetic wave drive signal repeatedly outputs a pulse current at a predetermined duty cycle during the period of the pulse width of the electromagnetic wave drive signal. Subsequently, the electromagnetic wave oscillator 32, upon receiving the pulse current, repeatedly oscillates the microwave pulse and outputs it to the distributor 33.

Figure 5:
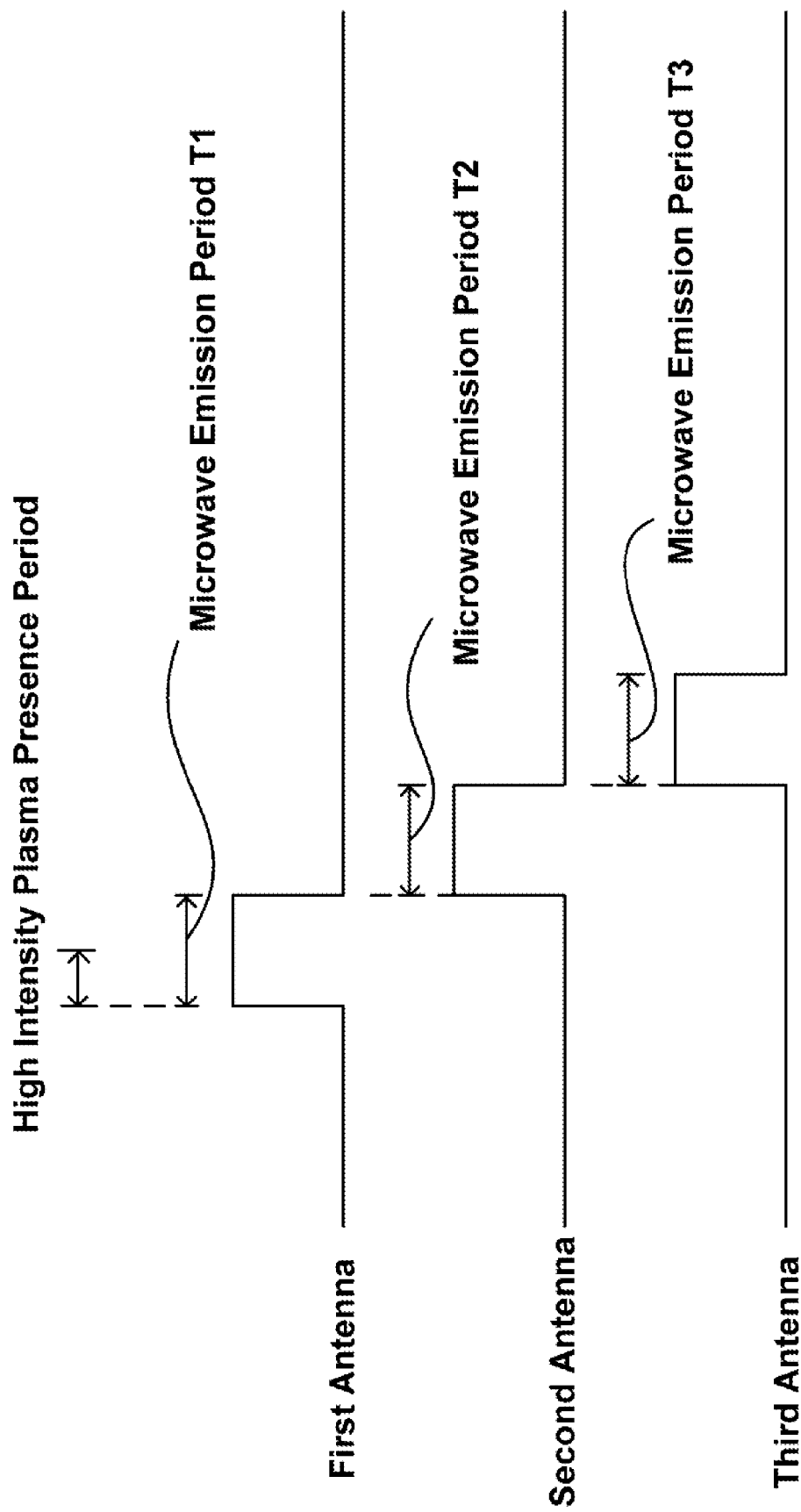
FIG. 5 is a time chart illustrating relationship between a presence period of high intensity plasma and periods of microwave emission according to the embodiment.

In the ignition operation, as shown in FIG. 5, during a period when the high intensity plasma 36 is present, the distributor 33 specifies the first antenna 41 as a supply destination of the microwave pulse so that the microwave is emitted from the first antenna 41. The microwave is emitted from the first antenna 41 to the combustion chamber 20. During the period when the high intensity plasma 36 is present, the strong electric field region 51, which has an electric field relatively strong in the combustion chamber 20, is formed in the vicinity of the emitting end of the first antenna 41. As shown in FIG. 3A, the high intensity plasma 36 is drifted by the strong tumble flow 35 toward the side of the exhaust ports 26, and the flexure part of the high intensity plasma 36 enters into the strong electric field region 51. Thus, the flexure part of the high intensity plasma 36 is irradiated with the microwave. The high intensity plasma 36 absorbs the energy of the microwave and is expanded, and becomes expanded microwave plasma.

The expanded microwave plasma is, as whole, reduced in temperature in comparison with the high intensity plasma 36 that has not yet been expanded. Therefore, within the microwave plasma, the lifetime of the active species is increased in comparison with the case of the high intensity plasma 36. Consequently, relatively large amount of the active species become present in the microwave plasma. As a result of this, a chemical reaction of the fuel air mixture is promoted, and the propagation speed of the ignited flame is increased. A flame surface expands outwardly from an ignition location toward the wall surface of the cylinder 24.

<Flame Propagation Promotion Operation>

For each combustion cycle, a flame propagation promotion operation of accelerating the propagation speed of the flame is performed while the flame is propagating after the ignition operation.

According to the present embodiment, as the flame propagation promotion operation, a first operation and a second operation are performed. As shown in FIG. 5, during a series of the first and second operations, the supply destination of the microwave is switched in order from the first antenna 41, the second antenna 42, and the third antenna 43. Here, the pulse width of the electromagnetic wave drive signal is configured so that the microwave pulse is continuously outputted until immediately after the flame surface reaches the wall surface of the cylinder 24.

During the first operation, the electronic control device 30 outputs a first distribution signal immediately before the flame surface reaches the emitting end of the second antenna 42. For example, the first distribution signal is outputted at a timing when the flame surface is passing through approximately a midpoint between the first and second antennae 41 and 42. The distributor 33, upon receiving the first distribution signal, switches the supply destination of the microwave to the second antenna 42. Then, as shown in FIG. 3B, the microwave is emitted from the second antenna 42 to the combustion chamber 20, and a strong electric field region 52 is formed in the vicinity of the emitting end of the second antenna 42. From the second antenna 42, the microwave is emitted until immediately after the flame surface has passed through the strong electric field region 52.

In the strong electric field region 52, for example, free electrons discharged from the flame are accelerated. The accelerated free electrons collide with ambient gas molecules. The gas molecules thus collided are ionized. Also, free electrons discharged owing to the ionization of the gas molecules are accelerated in the strong electric field region 52, and ambient molecules are ionized. In this manner, an avalanche-like gas molecule ionization occurs, and the microwave plasma is generated in the strong electric field region 52.

Furthermore, since the flame is weakly ionized plasma, the flame reacts with and is attracted to the electric field of the strong electric field region 52. The electromagnetic wave emission device 13 creates an electric field for attracting the flame toward a propagation direction of the flame by emitting the microwave from the antenna 42 after the fuel air mixture is ignited.

In the strong electric field region 52, active species (such as OH radical) having strong oxidation power are generated by the microwave plasma. According to the present embodiment, the active species are generated in a region not yet reached by the flame surface while the flame is propagating. This means that the flame surface passes through a region in which the active species have been generated. Therefore, the chemical reaction in the flame surface is promoted by the active species, and the propagation speed of the flame is accelerated.

Subsequently, during the second operation, the electronic control device 30 outputs a second distribution signal immediately before the flame surface reaches the emitting end of the third antenna 43. For example, the second distribution signal is outputted at a timing when the flame surface is passing through approximately a midpoint between the second and third antennae 42 and 43. The distributor 33, upon receiving the second distribution signal, switches the supply destination of the microwave to the third antenna 43. Then, as shown in FIG. 3C, a strong electric field region 53 is formed in the vicinity of the emitting end of the third antenna 43. In the strong electric field region 53, the microwave plasma is generated. In the second operation, similarly to the first operation, the microwave plasma is generated in a region not yet reached by the flame surface, and the strong electric field region 53 further attracts the flame. Therefore, the propagation speed of the flame is accelerated owing to the microwave plasma.

Effect of Embodiment

According to the present embodiment, the lean fuel air mixture can be stably ignited. In addition to this, the propagation speed of the flame can be accelerated by way of the microwave emitted from the antenna 41. Accordingly, it is possible to reduce the amount of exhausted unburned fuel in a case in which the lean fuel air mixture is combusted in the combustion chamber 20, and therefore, it is possible to improve fuel efficiency of the internal combustion engine 10.

Furthermore, according to the present embodiment, the plasma 36 that has been expanded by the alternating voltage generator 14 is further expanded by the microwave, thereby rendering the active species generated by the plasma to hardly disappear. Consequently, a larger amount of the active species can remain in the combustion chamber 20 in a case in which the microwave is emitted in comparison with a case in which the microwave is not emitted. As a result of this, the active species can promote the chemical reaction of the fuel air mixture. According to the present embodiment, it is possible to effectively accelerate the propagation speed of the flame by the active species.

Furthermore, according to the present embodiment, since it is advantageous to employ an electric wave of high frequency in order to create the electric field for accelerating the propagation speed of the flame, it is configured such that the frequency of the microwave oscillated by the electromagnetic wave oscillator 32 is set higher than that of an electric wave outputted from the ignition device 12. Furthermore, the ignition device 12 can be configured simpler in structure if the frequency of the electric wave is set low. Accordingly, the ignition device 12 can be configured simple in structure, while effectively accelerating the propagation speed of the flame.

Furthermore, according to the present embodiment, since the first transmission line 101 and the second transmission line 102 are separated from each other, it is possible to determine the location of the antenna 41 for emitting the microwave regardless of where the high intensity plasma 36 generates plasma, viz., plasma generation location of the high intensity plasma. Accordingly, the antenna 41 can be placed at any location as appropriate, and thus, it is possible to prevent energy from being concentrated at the tip end part 15c of the ignition plug 15. Furthermore, it is possible to create an electric field that can effectively accelerate the propagation speed of the flame. Therefore, it is possible to accelerate the propagation speed of the flame while preventing the ignition plug 15 from being damaged.

Furthermore, according to the present embodiment, since the strong electric field region 51 is formed at a location where the high intensity plasma 36, which has been drifted by the gas flow 35, is present, the high intensity plasma 36 generated by the ignition device 12 can effectively absorb the energy of the microwave. Accordingly, in comparison with a conventional internal combustion engine that is not configured in view of the fact that the high intensity plasma 36 may be drifted, it is possible to increase the energy of the microwave absorbed by the high intensity plasma 36.

Furthermore, according to the present embodiment, active species are generated in a region not yet reached by the flame surface so that the flame surface passes through a region where the active species have been generated. Accordingly, since a chemical reaction in the flame surface is promoted by the active species, it is possible to further accelerate the propagation speed of the flame surface.

First Modified Example of Embodiment

Figure 6:
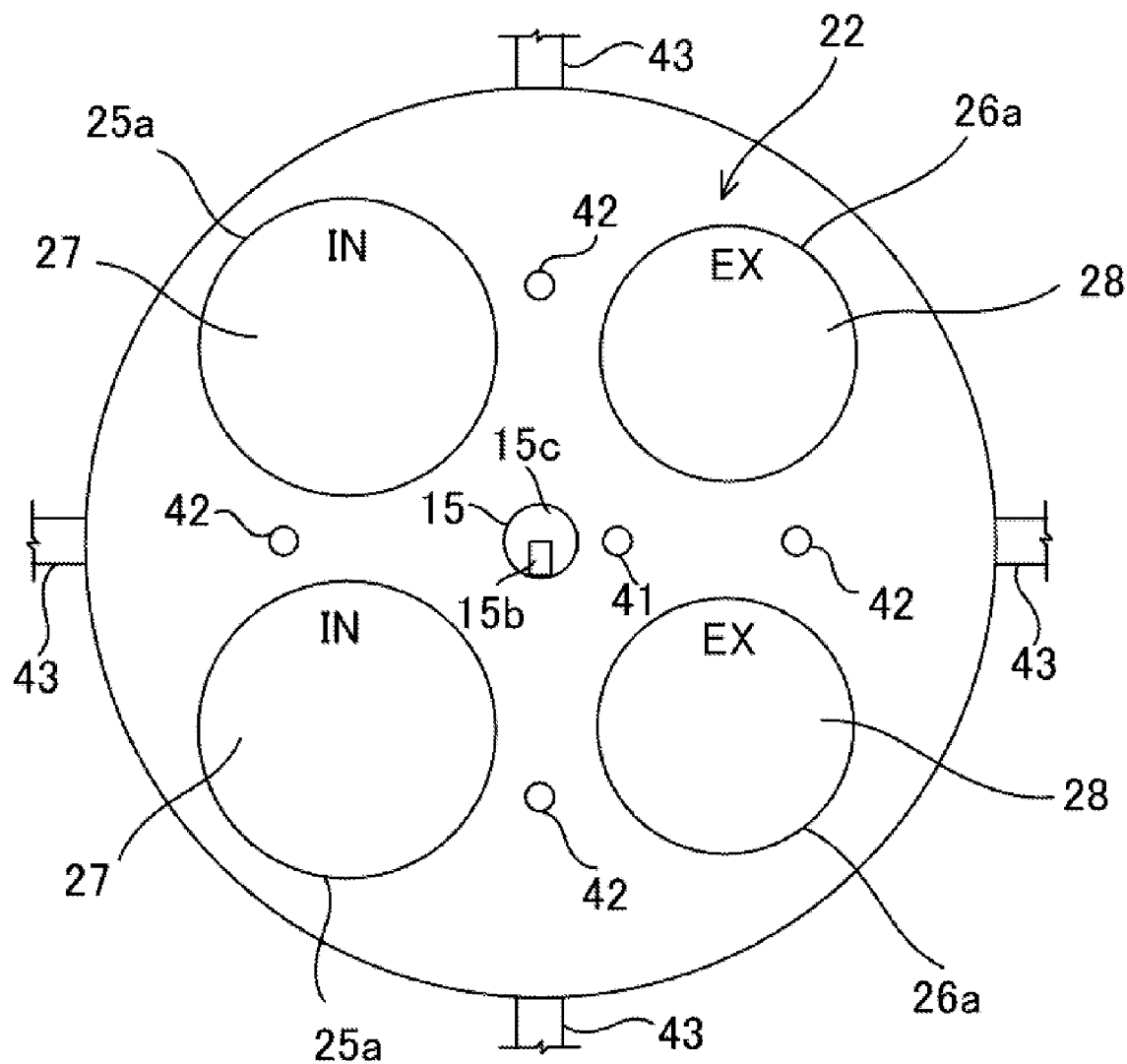
FIG. 6 is a front view of a ceiling surface of a combustion chamber of an internal combustion engine according to a first modified example of the embodiment.

According to the first modified example, as shown in FIG. 6, four antenna groups are provided. The number of antenna groups corresponds to the number of regions defined between adjacent opening parts 25a and 26a of the intake and exhaust ports 25 and 26.

A first antenna group (an antenna group on a right side of the ignition plug 15 in FIG. 6) is constituted by the first antenna 41, the second antenna 42, and the third antenna 43 of the embodiment described above. Each of the remaining second to fourth antenna groups is constituted by the second antenna 42 and the third antenna 43 of the embodiment described above. The electromagnetic wave emission device 13 is provided with an electromagnetic wave unit including a power supply for electromagnetic wave 31, an electromagnetic wave oscillator 32, and a distributor 33 for each antenna group.

The first antenna 41 is supplied with a microwave at the same timing as the first antenna 41 of the embodiment described above. Each second antenna 42 is supplied with a microwave at the same timing as the second antenna 42 of the embodiment described above. Each third antenna 43 is supplied with a microwave at the same timing as the third antenna 43 of the embodiment described above.

According to the first modified example, the propagation speed of the flame is increased in four directions in relation to the ignition location owing to the microwave plasma generated by the microwave emitted from each second antenna 42, and then, the microwave plasma generated by the microwave emitted from each third antenna 43. Accordingly, it is possible for the flame to be propagated uniformly.

Here, the high intensity plasma 36 is drifted toward the side of the exhaust ports 26 by the tumble flow 35, and the fuel air mixture is ignited at a location shifted to the side of the exhaust ports 26 from a center of the combustion chamber 20. Therefore, the energy of the microwaves emitted from the second and third antennae 42 and 43 on the side of the intake ports 25 (left side in FIG. 6) may be set relatively stronger than the other antennae.

Second Modified Example of Embodiment

Figure 7:
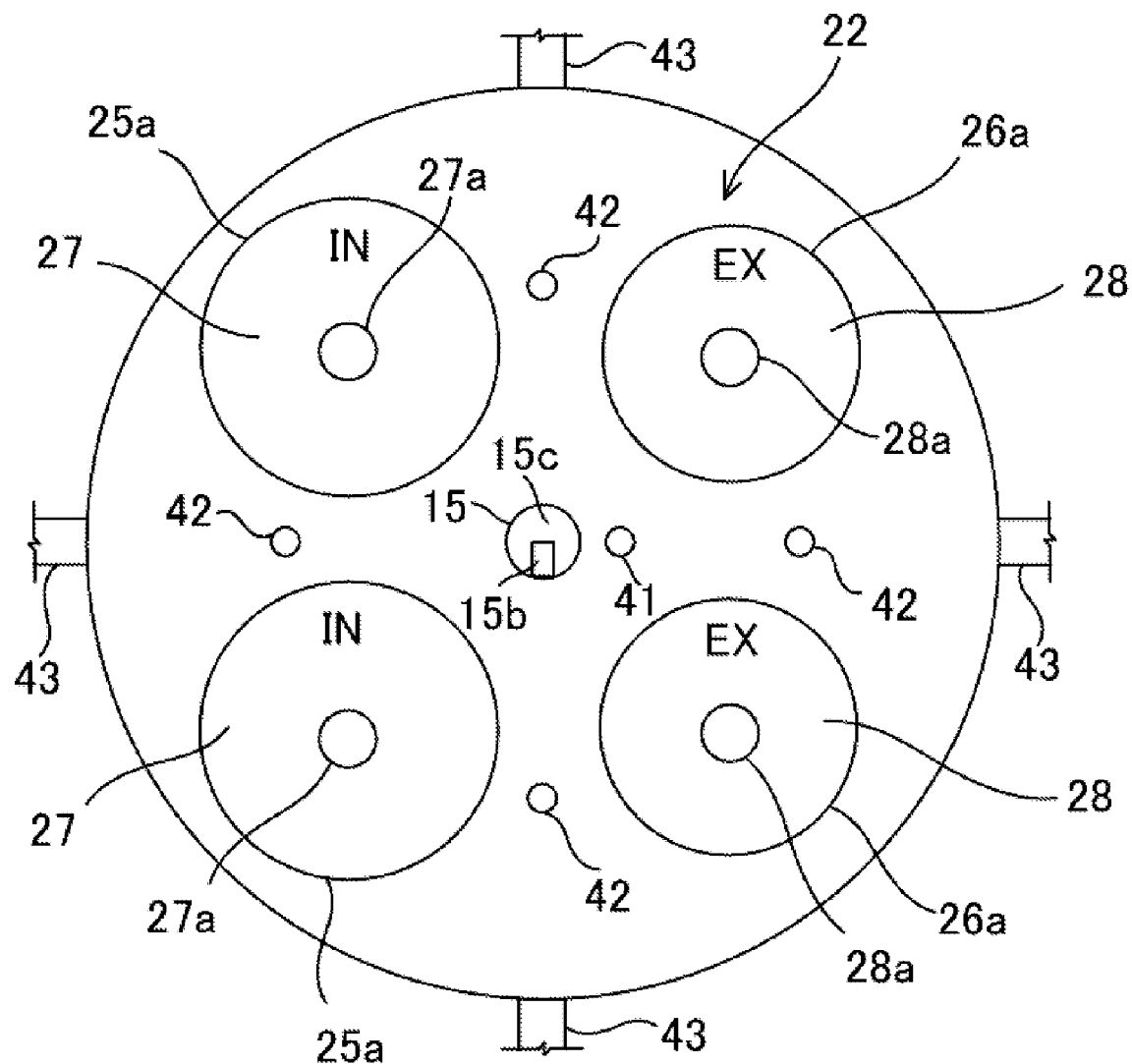
FIG. 7 is a front view of a ceiling surface of a combustion chamber of an internal combustion engine according to a second modified example of the embodiment.

According to the second modified example, as shown in FIG. 7, as antennae for supplying the microwave to regions not yet reached by the flame surface, similarly to the second antennae 42 and the third antennae 43, antennae 27*a* and 28*a* are provided on respective valve heads of the intake and exhaust valves 27 and 28. The antennae 27*a* and 28*a* are exposed from surfaces of the respective valve heads on a side of the combustion chamber 20. Transmission lines connecting to the antennae 27*a* and 28*a* are provided in respective valve shafts. The microwave outputted from the electromagnetic wave oscillator 32 is supplied to the transmission lines by way of non-contact power feeding and reaches the antennae 27*a* and 28*a* via the respective transmission lines.

Third Modified Example of Embodiment

Figure 8:
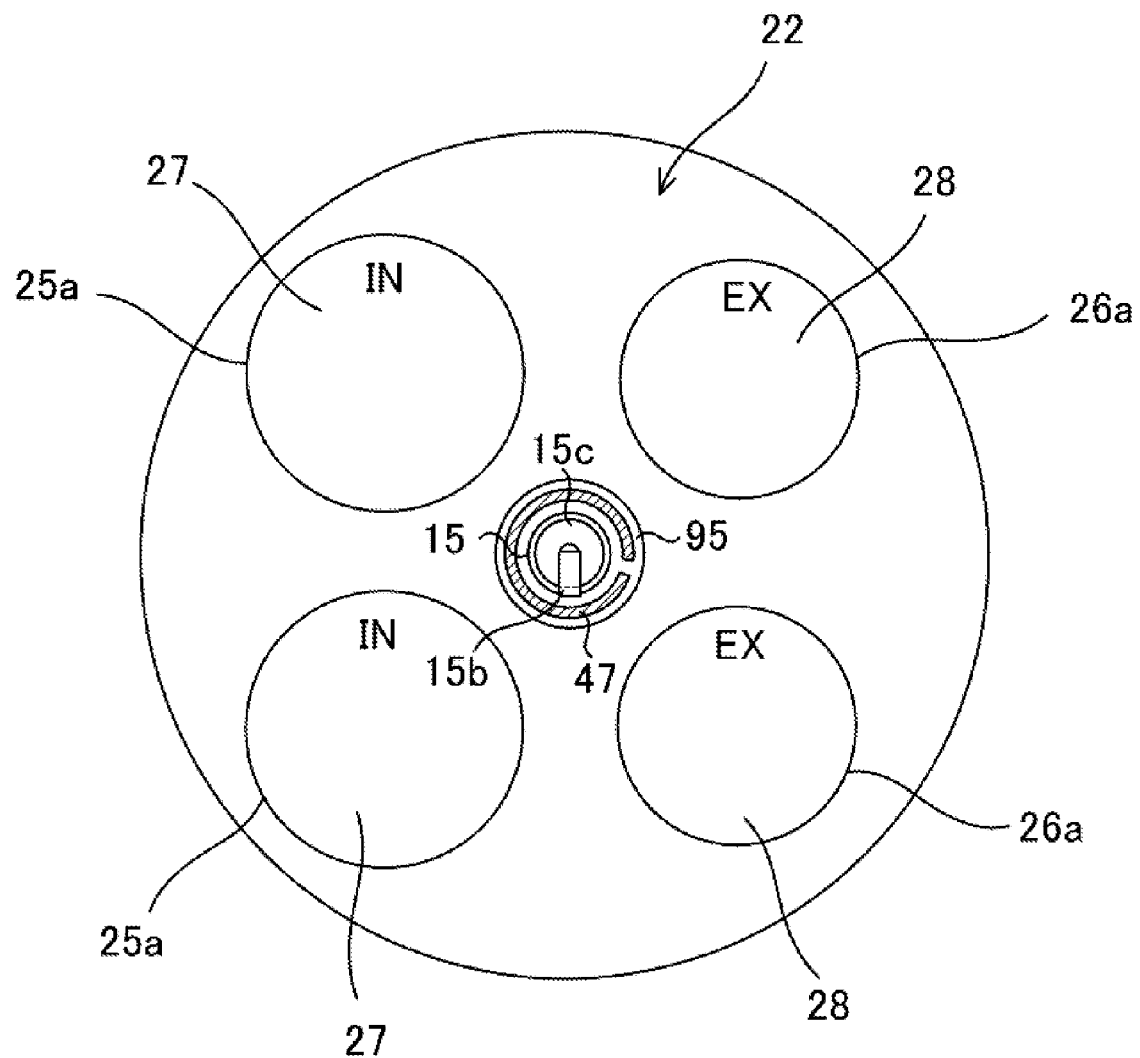
FIG. 8 is a front view of a ceiling surface of a combustion chamber of an internal combustion engine according to a third modified example of the embodiment.

According to the third modified example, as shown in FIG. 8, an antenna 47 in the vicinity of the ignition plug 15 extends on the ceiling surface of the combustion chamber 20 along and outwardly of an outer periphery of the tip end part 15*c* of the ignition plug 15. The antenna 47 is formed in a shape of a letter C in a front view of the ceiling surface of the combustion chamber 20 so as to surround the tip end part 15*c* of the ignition plug 15. The antenna 47 may be formed in a shape of a ring in the front view of the ceiling surface of the combustion chamber 20.

Figure 9:
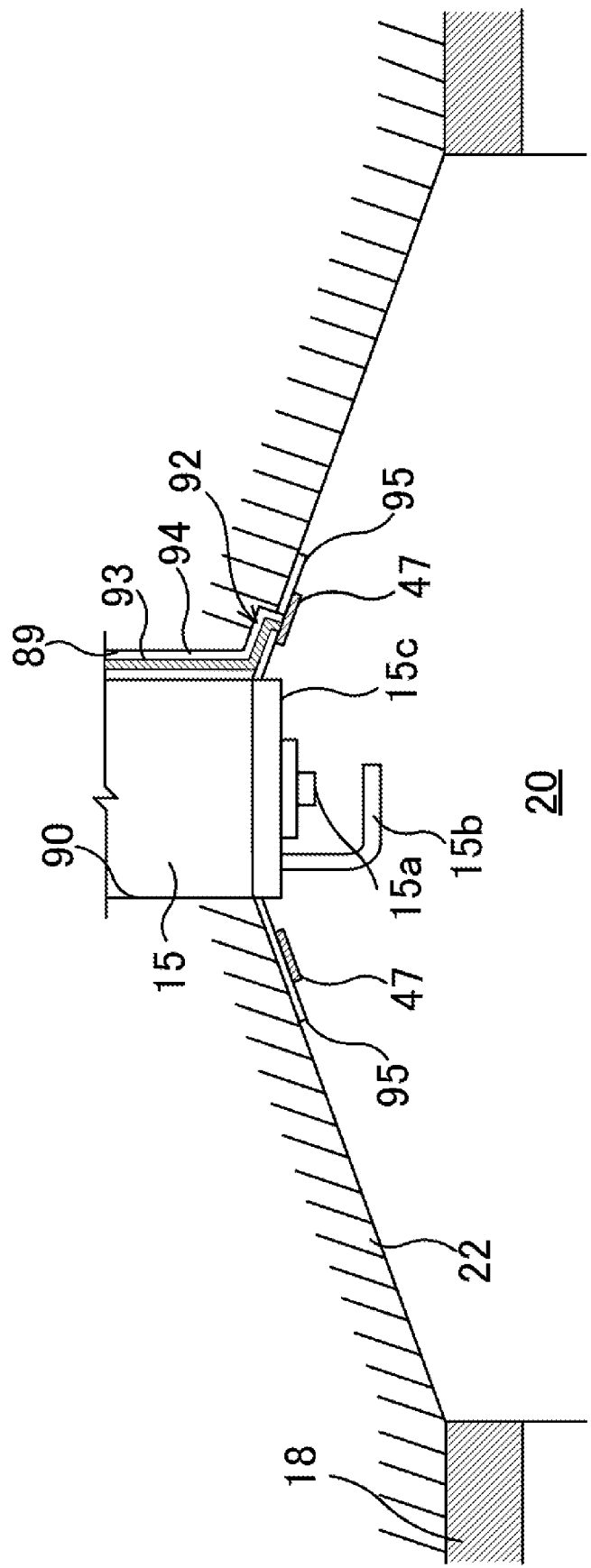
FIG. 9 is a schematic configuration diagram of a relevant part of the internal combustion engine according to the third modified example of the embodiment.

As shown in FIG. 9, the antenna 47 is formed in a plate like shape and is mounted on a ring shaped insulating member 95 that is formed along an outer periphery of an attachment hole 90 for the ignition plug 15 on the side of the combustion chamber 20. The insulating member 95 is formed by, for example, thermal spray coating of insulating material. The antenna 47 is electrically insulated from the cylinder head 22 by the insulating member 95. A circumferential length of the antenna 47 (a circumferential length of a mid circle between an outer periphery and an inner periphery) is configured to be equal to a quarter wavelength of the microwave oscillated by the electromagnetic wave oscillator 32.

The cylinder head 22 is formed with an attachment groove 89 for attaching a coaxial line 92 in continuation with the attachment hole 90 for the ignition plug 15. The coaxial line 92 is connected by a central conductor 93 inside of an insulating member 94 to an end of the letter C of the antenna 47. The coaxial line 92 may be embedded in the ignition plug 15 so that an output end of the coaxial line 92 is exposed from an outer peripheral surface of the ignition plug 15, and a transmission line is provided from the exposed part to the antenna 47.

According to the third modified example, during the ignition operation, the microwave is emitted from the antenna 47. The antenna 47 forms a strong electric field region so as to surround the discharge gap of the ignition plug 15. The antenna 47 forms the strong electric field region at a location where the high intensity plasma 36, which has been drifted by the tumble flow 35, is present. The antenna 47 faces toward a flexure part of the high intensity plasma 36 furthest away from the discharge gap.

In the ignition operation, the microwave is emitted from the antenna 47 during the period when the high intensity plasma 36 is present. During the period when the high intensity plasma 36 is present, the strong electric field region is formed in the vicinity of the antenna 47. The high intensity plasma 36 is drifted toward the side of the exhaust ports 26 by the strong tumble flow 35, and the flexure part thereof enters into the strong electric field region. The flexure part of the high intensity plasma 36 is irradiated with the microwave. The high intensity plasma 36 absorbs the energy of the microwave and expands.

An attraction electrode for attracting an electric field created by the electromagnetic wave may be provided in a region adjacently located outside of the antenna 47. The attraction electrode is arranged in the vicinity of the antenna 47 on a side opposite to the ignition plug 15 in relation to the antenna 47. As a result of this, the electric field is hardly attracted toward the central electrode 15*a*, and therefore, it is possible to prevent the central electrode 15*a* from being damaged.

Fourth Modified Example of Embodiment

Figure 10:
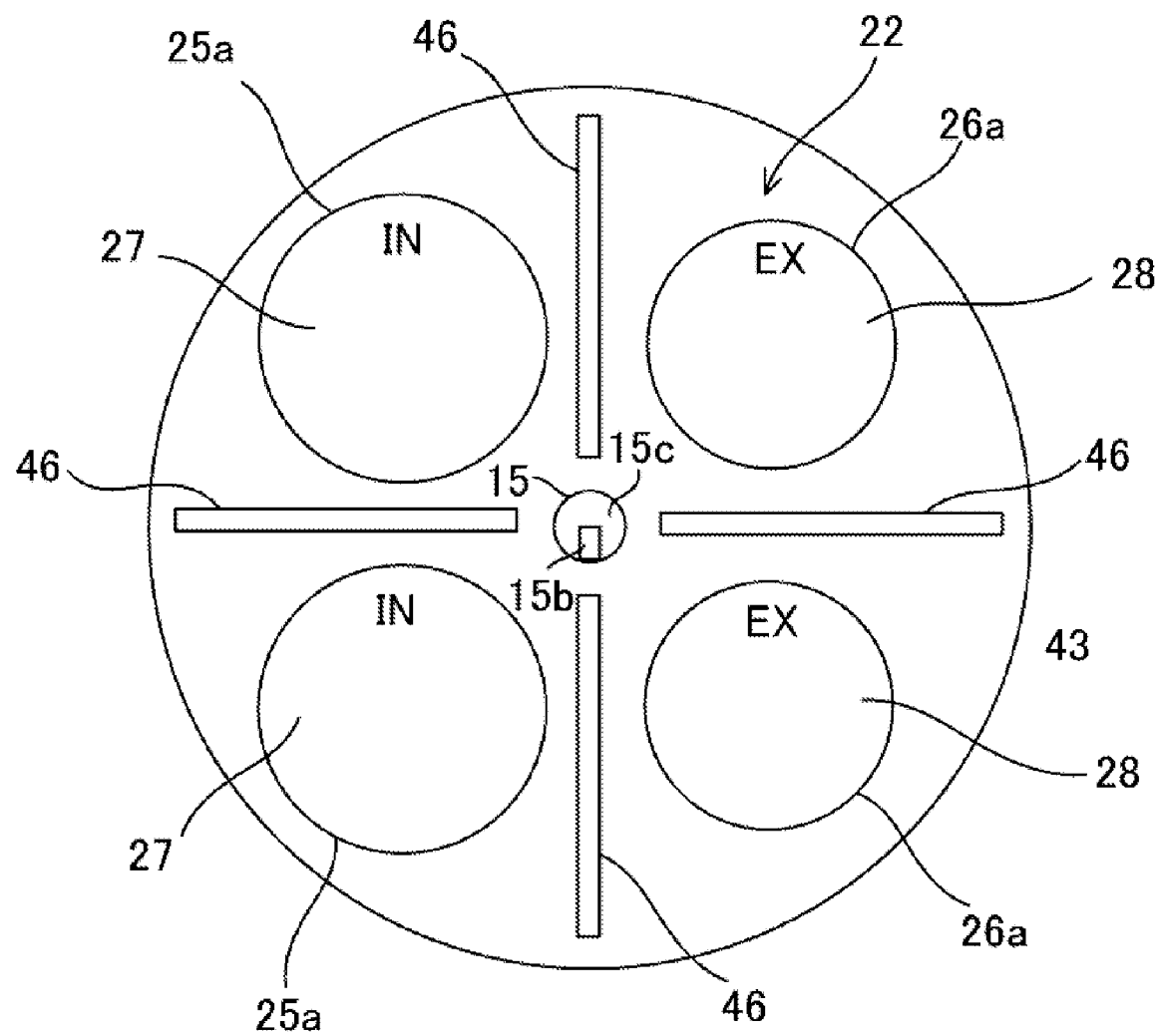
FIG. 10 is a front view of a ceiling surface of a combustion chamber of an internal combustion engine according to a fourth modified example of the embodiment.

According to the fourth modified example, as shown in FIG. 10, in place of the antenna groups of the first modified example, rod shaped antennae 46 are provided. The antennae 46 are electrically insulated from the cylinder head 22 by respective insulating members (not shown). The antennae 46 extend in respective radial directions on the ceiling surface of the combustion chamber 20 along the respective intervening regions each defined by the adjacent opening parts 25*a* and 26*a* of the intake and exhaust ports 25 and 26. Each antenna 46 extends from slightly outwardly of the ignition plug 15 straightforwardly toward the vicinity of the wall surface of the cylinder 24. Here, at least one antenna 46 disposed between the adjacent opening parts 26*a* of the exhaust ports 26 (the antenna on the right side of the ignition plug 15 in FIG. 10) faces toward the flexure part of the high intensity plasma 36 at an inner end of the at least one antenna 46.

The electromagnetic wave emission device 13 is provided with an electromagnetic wave unit that includes a power supply for electromagnetic wave 31 and an electromagnetic wave oscillator 32 for each antenna 46. Each electromagnetic wave unit, unlike the first modified example, does not include a distributor 33. Instead, each electromagnetic wave unit includes an electric field adjuster that changes a location of a strong electric field region, which has an electric field relatively strong in intensity on a surface of the antenna 46. The electric field adjuster is, for example, a stub tuner that can adjust impedance of a transmission line of the microwave. The stub tuner is configured to be capable of changing a length of a stub (length operable as a stub) by, for example, adjusting a location of short-circuiting the stub to the ground.

During the ignition operation, each electromagnetic wave unit causes the electric field adjuster to operate so that the strong electric field region formed by the microwave emitted from the antenna 46 is located at an inner end of the antenna 46. An emitting position of the antenna 46 disposed between the opening parts 26*a* of the exhaust ports 26 faces toward the high intensity plasma 36 that has been drifted by the tumble flow 35. Accordingly, the high intensity plasma 36 effectively absorbs the energy of the microwave.

The microwave is continuously emitted from each antenna 46 while the flame is propagating after the fuel air mixture is ignited. The electric field adjuster moves the emitting position of the microwave on each antenna 46 outwardly ahead of the flame surface. A region not yet reached by the flame surface becomes the strong electric field region. The strong electric field region moves outwardly, and the microwave plasma generated in the strong electric field region also moves outwardly along with the movement of the strong electric field region. As a result of this, the flame surface passes through a region in which the active species have been generated, a chemical reaction on the flame surface is promoted by the active species, and thus, the propagation speed of the flame is improved.

In a case in which the antenna 47 having a shape of the letter C described in the third modified example is employed, the electric field adjuster may be employed as well, in order to adjust a location of the strong electric field region. The antenna 47 in the shape of the letter C described in the third modified example may be additionally applied to the fourth modified example.

Fifth Modified Example of Embodiment

Figure 11:
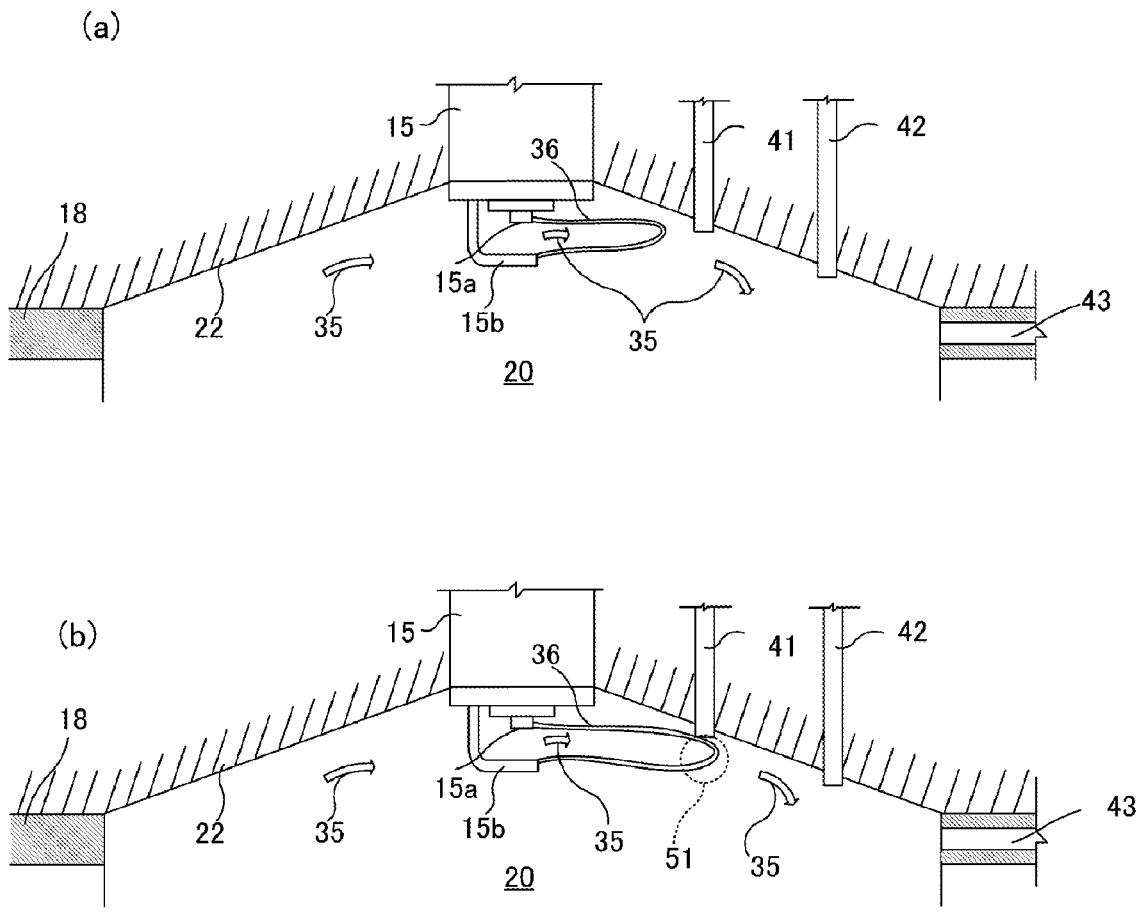
FIG. 11 is schematic configuration diagrams of a relevant part of an internal combustion engine according to a fifth modified example of the embodiment, FIG. 11A showing a first antenna not emitting a microwave, FIG. 11B showing the first antenna emitting a microwave.

According to the fifth modified example, as shown in FIG. 11, the distance between the first antenna 41 and the ignition plug 15 is increased in comparison with the case of the embodiment described above. During the ignition operation, the emitting position of the microwave on the first antenna 41 is located downstream of the discharge gap in the direction of the gas flow 35 at the discharge gap. The first antenna 41 is disposed so as to form a strong electric field region 51 in the vicinity of a location where the high intensity plasma 36, which has been drifted by the tumble flow 35, is present. The first antenna 41 is disposed so as to form the strong electric field region 51 downstream in a drift direction of the high intensity plasma 36 in relation to a location where the plasma has been located. During the ignition operation, the microwave emitted from the first antenna 41 forms the strong electric field region 51 in a region adjacent to the high intensity plasma 36 that has been drifted by the tumble flow 35.

In the ignition operation, the first antenna 41 emits the microwave to the combustion chamber 20 during the same period as described above with respect to the embodiment described above. The first antenna 41 emits the microwave during the period when the high intensity plasma 36 is present. Here, in a case in which the strong electric field region 51 is not formed, the high intensity plasma 36 is extended only to a location shown in FIG. 11A. On the other hand, in a case in which the strong electric field region 51 is formed, the high intensity plasma 36 reacts with an electric field in the strong electric field region 51, and then, further stretches and enters into the strong electric field region 51, as shown in FIG. 11B. The high intensity plasma 36 effectively absorbs the energy of the microwave, and becomes microwave plasma.

Sixth Modified Example of Embodiment

Figure 12:
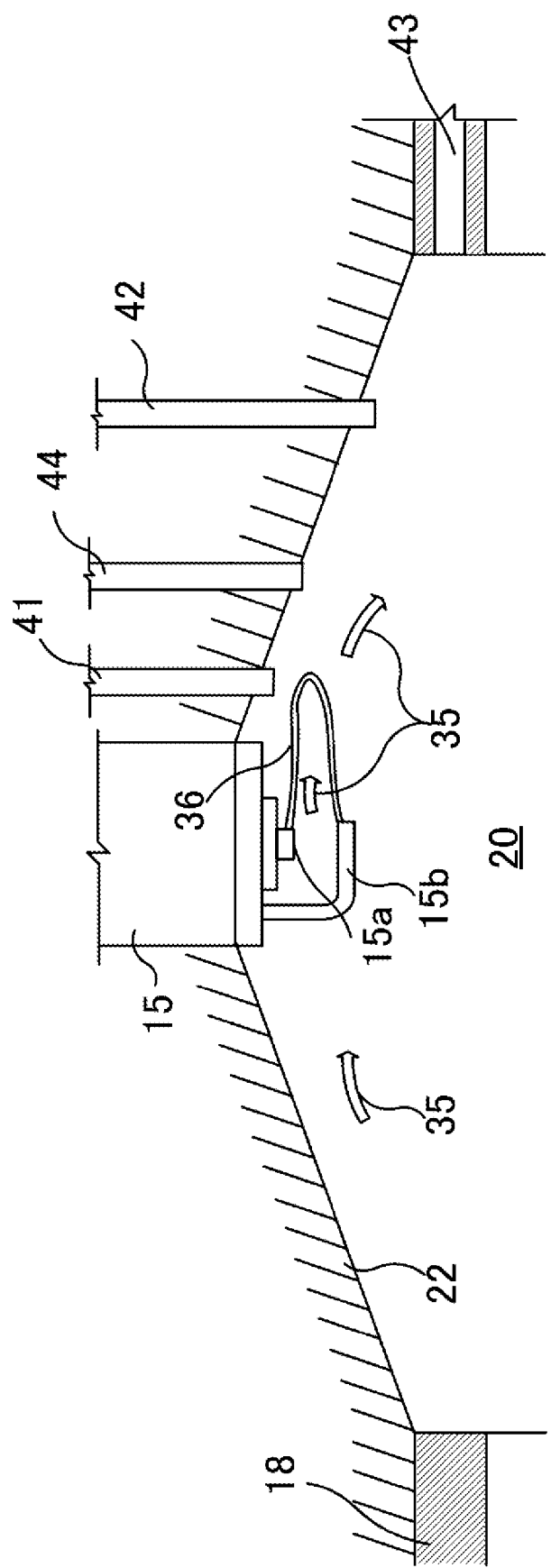
FIG. 12 is a schematic configuration diagram of a relevant part of an internal combustion engine according to a sixth modified example of the embodiment.

According to the sixth modified example, as shown in FIG. 12, in addition to the three antennae 41 to 43 of the embodiment described above, a fourth antenna 44 is provided at the location of the first antenna of the fifth modified example. During the ignition operation, the microwave emitted from the fourth antenna 44 forms a strong electric field region in a region adjacent to the high intensity plasma 36 that has been drifted by the gas flow 35.

More particularly, firstly in the ignition operation, the first antenna 41 starts to emit the microwave. The high intensity plasma 36 that has been stretched due to the tumble flow 35 absorbs the energy of the microwave emitted from the first antenna 41. Subsequently, the distributor 33 switches the supply destination of the microwave to the fourth antenna 44. In the vicinity of an emitting end of the fourth antenna 44, a strong electric field region is formed. The expanded high intensity plasma 36 reacts with an electric field of the strong electric field region in the vicinity of the emitting end of the fourth antenna 44. The high intensity plasma 36 is supplied with the energy of the microwave from the fourth antenna 44 as well.

An emission period of the microwave from the first antenna 41 may overlap with an emission period of the microwave from the fourth antenna 44. In this case, for example, a first electromagnetic wave oscillator that supplies a microwave to the first antenna 41, and a second electromagnetic wave oscillator that supplies a microwave to the fourth antenna 44 are provided. Oscillation periods of the microwaves by the respective electromagnetic wave oscillators may be configured to be equal to each other, or a start and end of the oscillation period of the second electromagnetic wave oscillator may be configured to be delayed with respect to those of the other.

Seventh Modified Example of Embodiment

Figure 13:
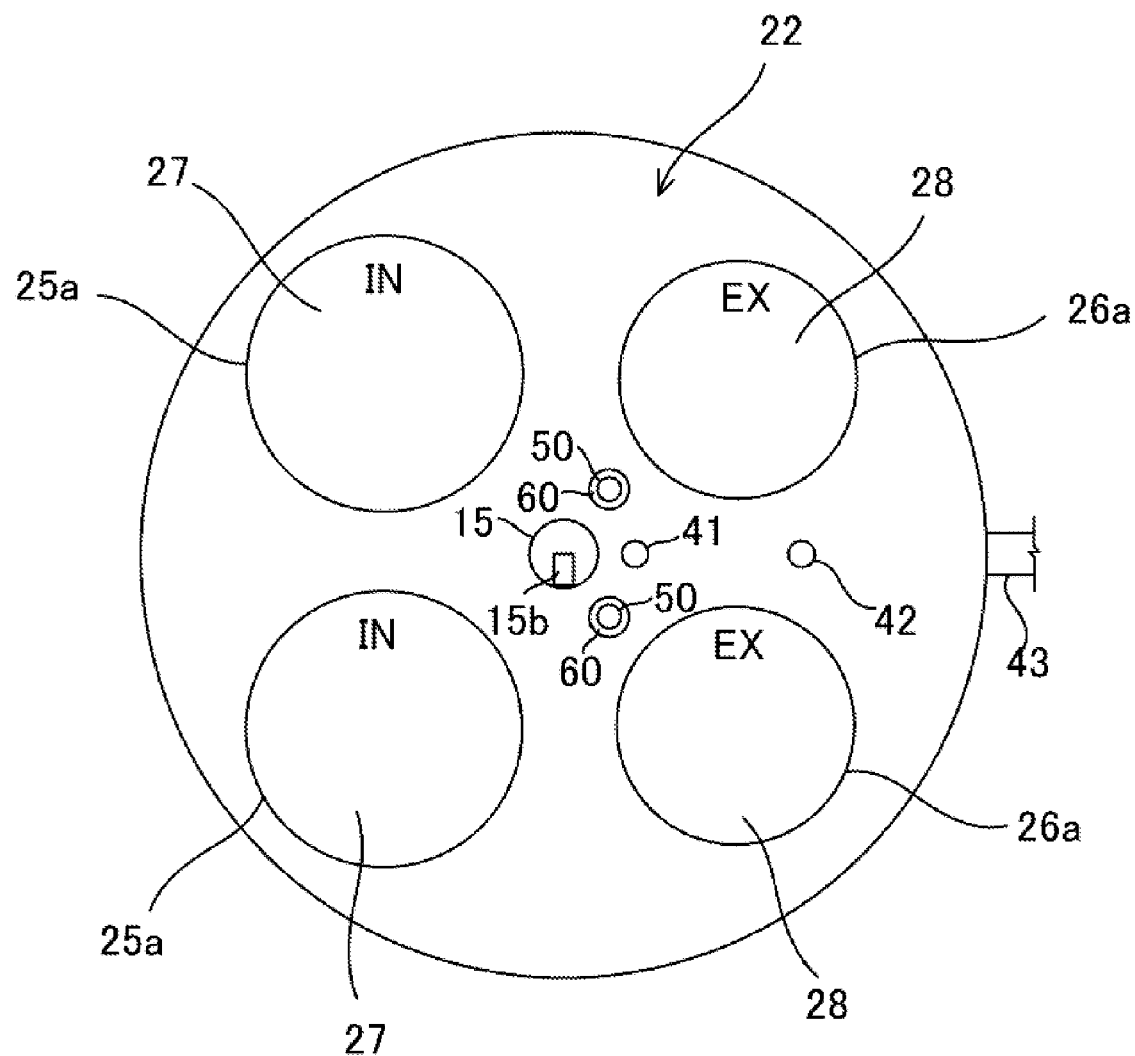
FIG. 13 is a front view of a ceiling surface of a combustion chamber of an internal combustion engine according to a seventh modified example of the embodiment.

According to the seventh modified example, as shown in FIG. 13, floating electrodes 50, which is operative to keep the high intensity plasma 36 drifting at a constant direction, are provided on a surface of the cylinder head 22 exposed toward the combustion chamber 20. A pair of the floating electrodes 50 are provided facing toward each other on opposite sides with respect to the direction of the gas flow 35 at the discharge gap (a line connecting the ignition plug 15 and the first antenna 41). Each floating electrode 50 is insulated from the cylinder head 22 by an insulating member 60.

Eighth Modified Example of Embodiment

Figure 14:
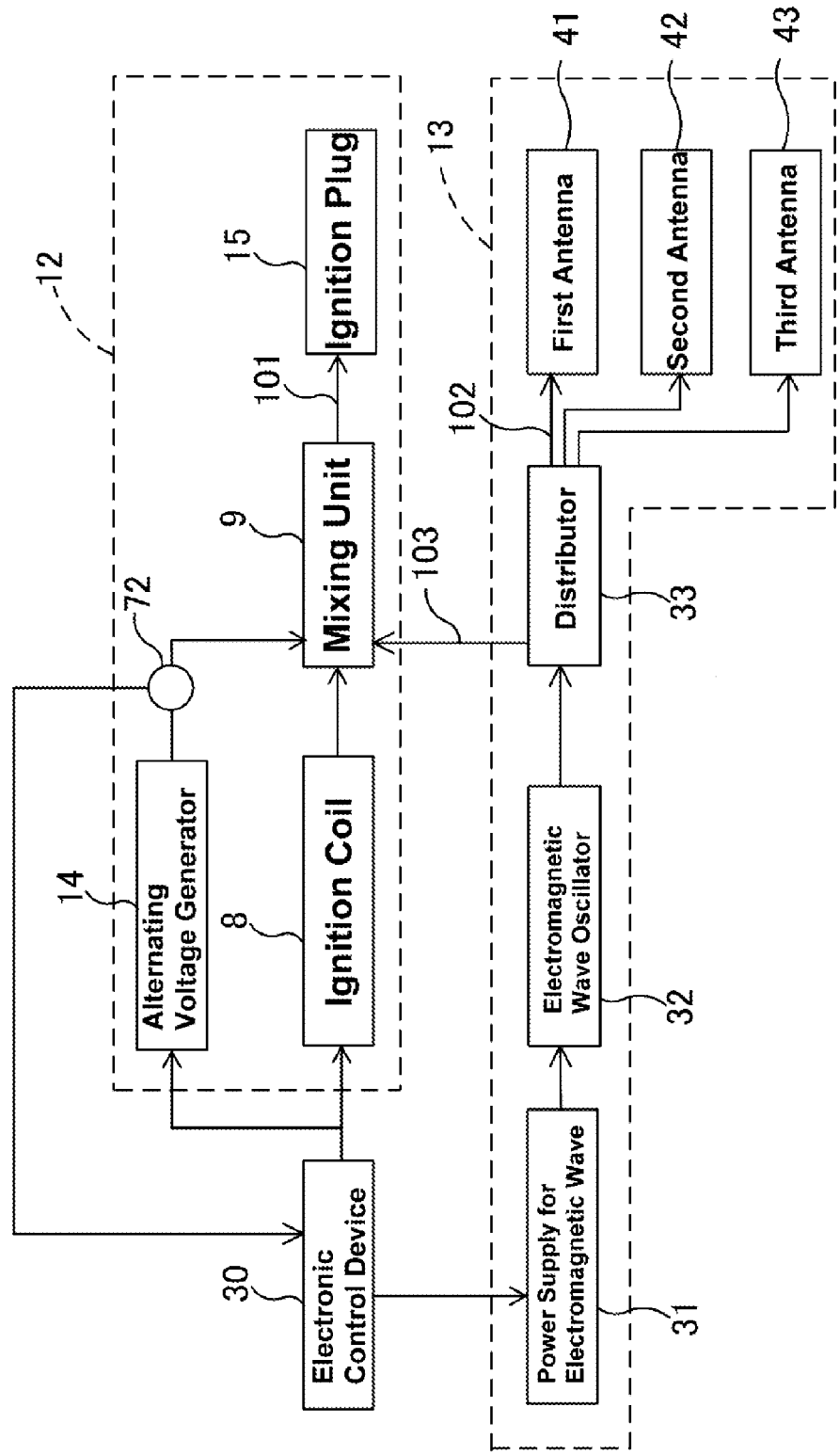
FIG. 14 is a block diagram of an ignition device and an electromagnetic wave emission device according to an eighth modified example of the embodiment.

According to the eighth modified example, as shown in FIG. 14, there is provided a switchable transmission line 103 for supplying the central electrode 15a with the microwave outputted from the electromagnetic wave oscillator 32. The switchable transmission line 103 is connected to the distributor 33 at an input side, and to the mixing unit 9 at an output side.

Figure 15:
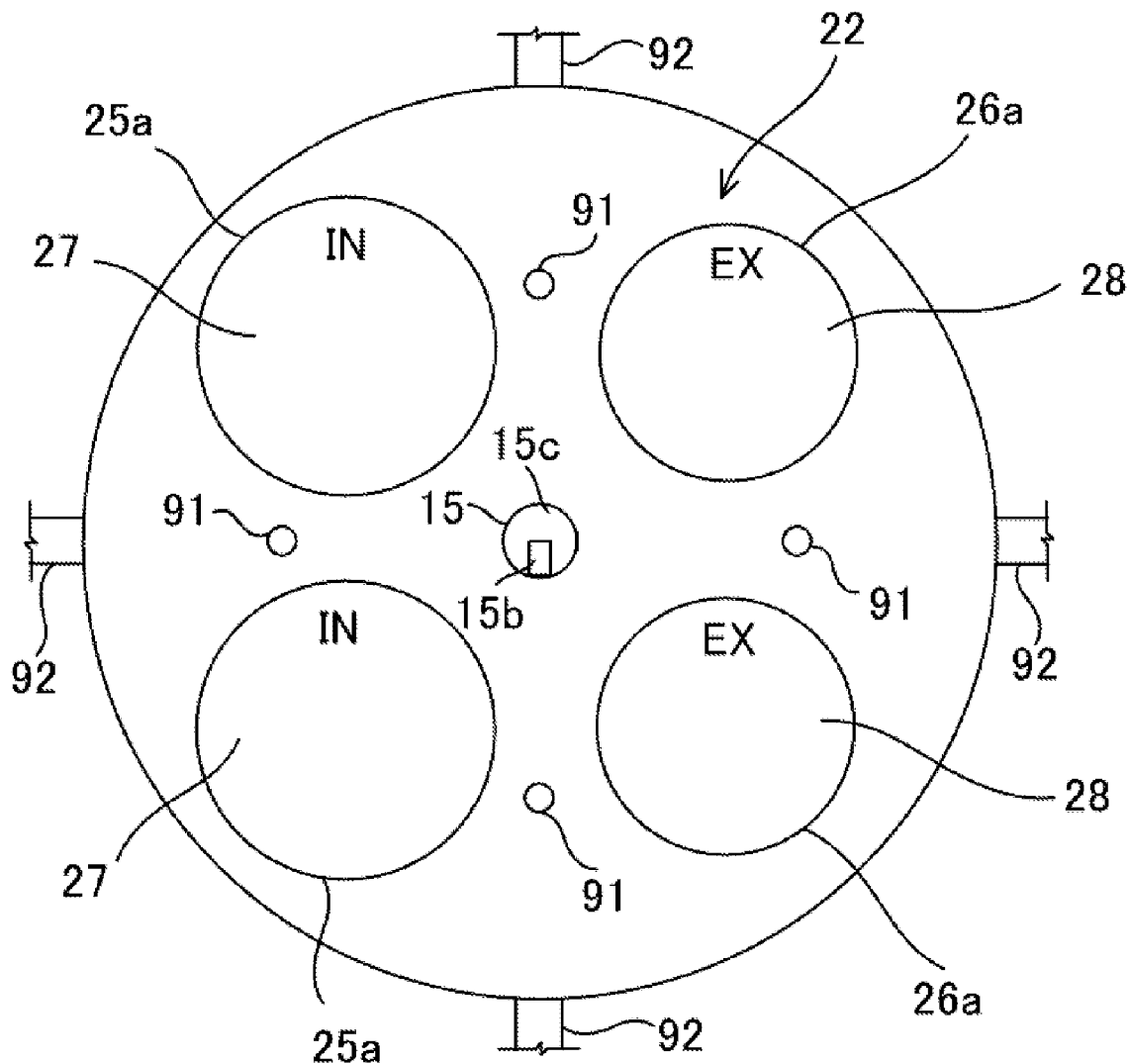
FIG. 15 is a front view of a ceiling surface of a combustion chamber of an internal combustion engine according to the eighth modified example of the embodiment.
Figure 16:
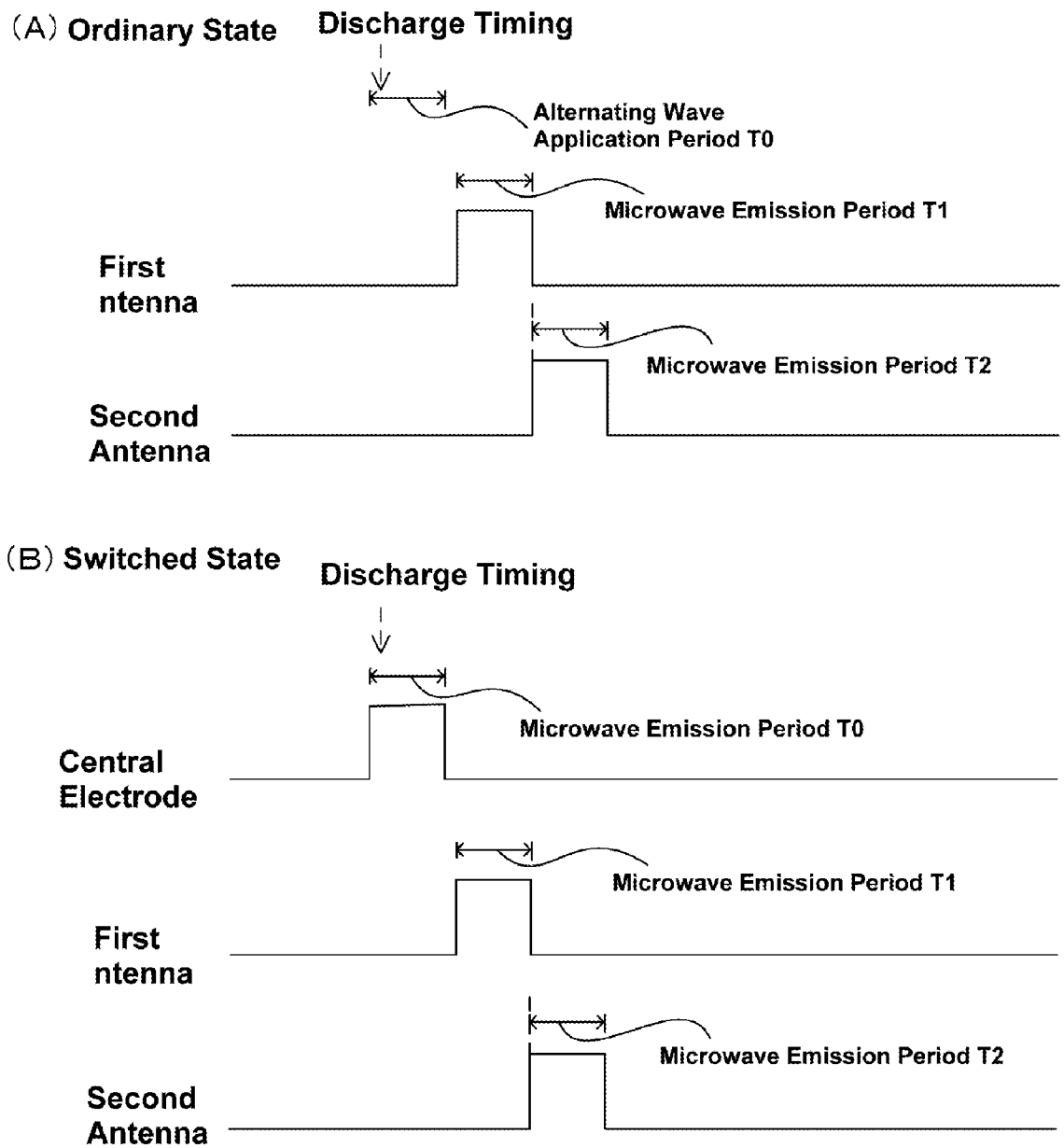
FIG. 16 is time charts illustrating relationship between a discharge timing and periods of microwave emission according to the eighth modified example of the embodiment.

According to the eighth modified example, as shown in FIG. 15, the antenna 41 is not provided in the vicinity of the ignition plug 15, and the microwave for expanding the high intensity plasma 36 is not emitted during the ignition operation. As shown in FIG. 16A, after an alternating wave application period of applying the alternating wave outputted from the alternating voltage generator 14 to the central electrode 15a, microwaves are sequentially emitted in order to accelerate the propagation speed of the flame from a first antenna 91 in the vicinity of a midpoint between the ignition plug 15 and the wall surface of the cylinder 24, and then from a second antenna 92 embedded in the gasket 18. Meanwhile, the distributor 33 switches an output destination of the microwave between respective output terminals (hereinafter, referred to as "antenna side output terminals") for the first and second antennae 91 and 92.

In addition to the two antenna side output terminals, the distributor 33 of the eighth modified example is provided with an output terminal (hereinafter, referred to as a "switched side output terminal") for connecting the switchable transmission line 103. The distributor 33 is configured to be capable of switching the output destination of the microwave from among the three output terminals. The distributor 33 constitutes a switching unit that is switchable between an ordinary state, in which the microwave outputted from the electromagnetic wave oscillator 32 is supplied to the antenna 41 via the second transmission line 102, and a switched state, in which the microwave outputted from the electromagnetic wave oscillator 32 is supplied to the central electrode 15a via the switchable transmission line 103.

The electronic control device 30 receives information on an operating condition of the alternating voltage generator 14 based on, for example, an output value of an ammeter 72 that measures a current value of the alternating wave outputted from the alternating voltage generator 14. During the ignition operation, if the output value of the ammeter 72 is below a predetermined threshold value, the electronic control device 30 determines that the alternating voltage generator 14 has a failure. The electronic control device 30 and the ammeter 72 constitute a failure detection unit that detects a failure in a generation operation in which the alternating voltage generator 14 generates the high intensity plasma 36.

If the alternating voltage generator 14 has a failure, the electric energy supplied to the combustion chamber 20 from the alternating voltage generator 14 during the ignition operation is decreased, thereby making it difficult for the discharge plasma to be expanded. As a result of this, ignitability of the fuel air mixture is deteriorated, and the fuel air mixture cannot be ignited stably.

In view of the above described problem, according to the eighth modified example, the electronic control device 30 constitutes a control unit that, in a case in which a failure is detected in the generation operation, causes the electromagnetic wave oscillator 32 to output a microwave at a discharge timing (the ignition timing) when the ignition plug 15 discharges, while setting the distributor 33 (the switching unit) to the switched state at the discharge timing. The distributor 33 outputs a microwave from the switched side output terminal at the discharge timing. The microwave outputted from the switched side output terminal is inputted to the mixing unit 9 via the switchable transmission line 103 and mixed with the high voltage pulse outputted from the ignition coil 8. The ignition plug 15 is supplied with the high voltage pulse and the microwave. Subsequently, as shown in FIG. 16B, the microwave is emitted from the central electrode 15a at the discharge timing. As a result of this, in the ignition plug 15, the discharge plasma generated by the spark discharge receives the energy of the microwave and expands so as to form the high intensity plasma 36.

According to the eighth modified example, an emission destination of the microwave is switchable between the central electrode 15a and the antennae 91 and 92. Therefore, it is possible to switch the emission destination of the microwave in accordance with an operating condition of the internal combustion engine 10, for example.

Furthermore, according to the eighth modified example, in a case in which the alternating voltage generator 14 has a failure in the generation operation of generating the high intensity plasma 36, it is possible to expand the discharge plasma by the electric energy outputted from the electromagnetic wave oscillator 32 in place of the alternating voltage generator 14. Therefore, it is possible to prevent ignitability from being deteriorated due to the failure of the alternating voltage generator 14.

The electronic control device 30 may, in a case in which a gas flow rate of the intake port 25 exceeds a predetermined flow rate, cause the electromagnetic wave oscillator 32 to output a microwave at the discharge timing (the ignition timing) when the ignition plug 15 discharges, while setting the distributor 33 (the switching unit) to the switched state at the discharge timing. In this case, if the discharge plasma is distant from the central electrode 15a under an operating condition in which the gas flow is strong, the microwave is emitted in order to expand the discharge plasma. Accordingly, it is possible to ignite the fuel air mixture by the high intensity plasma 36 even under the operating condition in which the gas flow is strong.

Ninth Modified Example of Embodiment

According to the ninth modified example, in addition to configuration of the eighth modified example, the microwave outputted from the electromagnetic wave oscillator 32 is allowed to be supplied to the central electrode 15a merely in a specific operating range (for example, heavy load and high rotational speed operation ranges) even in a case in which the alternating voltage generator 14 has no failure.

In the specific operating range described above, for each combustion cycle in the combustion chamber 20, the electromagnetic wave oscillator 32 outputs the microwave at the discharge timing when the ignition plug 15 discharges and during a propagation period of the flame. For each combustion cycle in the combustion chamber 20, the distributor 33 is switched to the switched state at the discharge timing, and then, switched to the ordinary state during the propagation period of the flame.

At the discharge timing, the microwave outputted from the electromagnetic wave oscillator 32 is supplied to the central electrode 15a of the ignition plug 15 via the switchable transmission line 103. On the other hand, during the propagation period of the flame, the microwave outputted from the electromagnetic wave oscillator 32 is sequentially supplied to the first and second antennae 91 and 92 via the second transmission line 102.

According to the ninth modified example, at the discharge timing, the central electrode 15a of the ignition plug 15 is supplied with the microwave in addition to the high voltage pulse and the alternating wave. Accordingly, it is possible to improve ignitability in the specific operating range.

Tenth Modified Example of Embodiment

Figure 17:
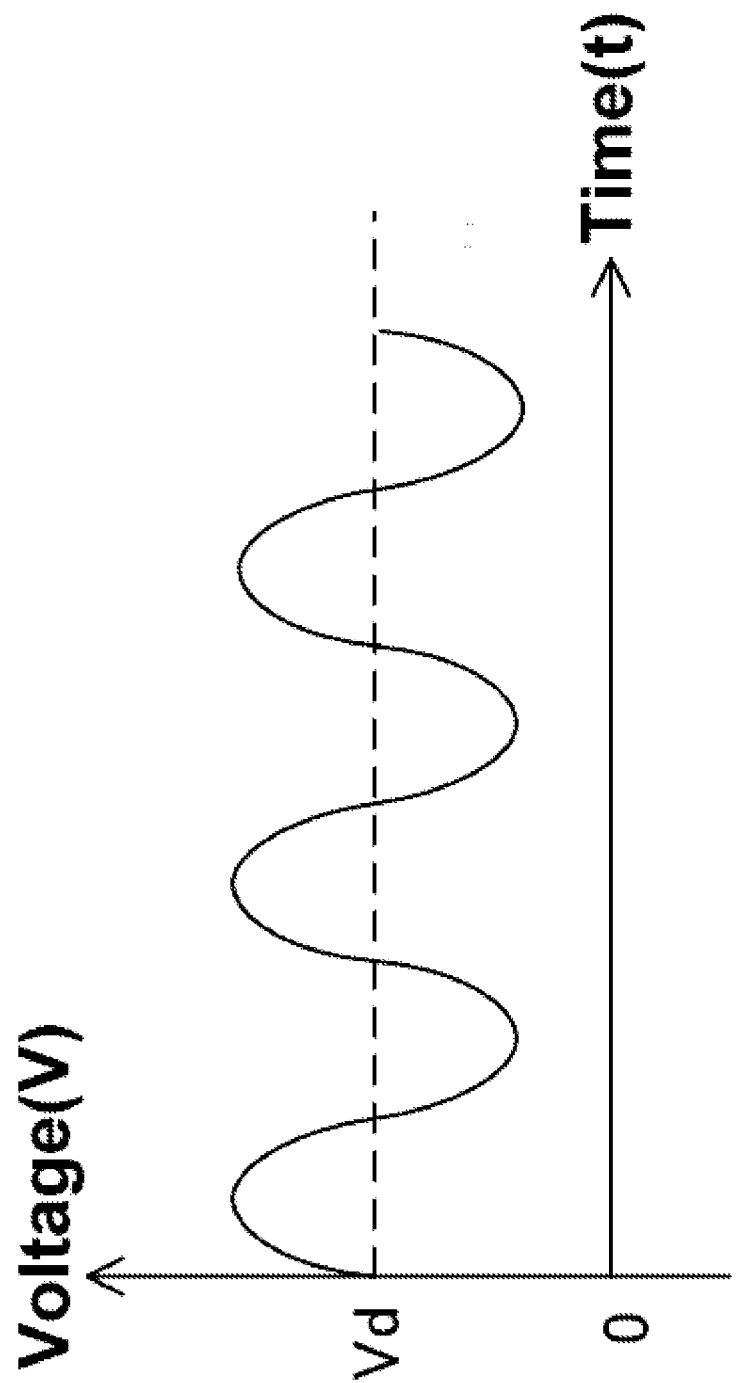
FIG. 17 is a diagram showing a time series variation of a voltage value of an antenna according to a tenth modified example of the embodiment.
Figure 18:
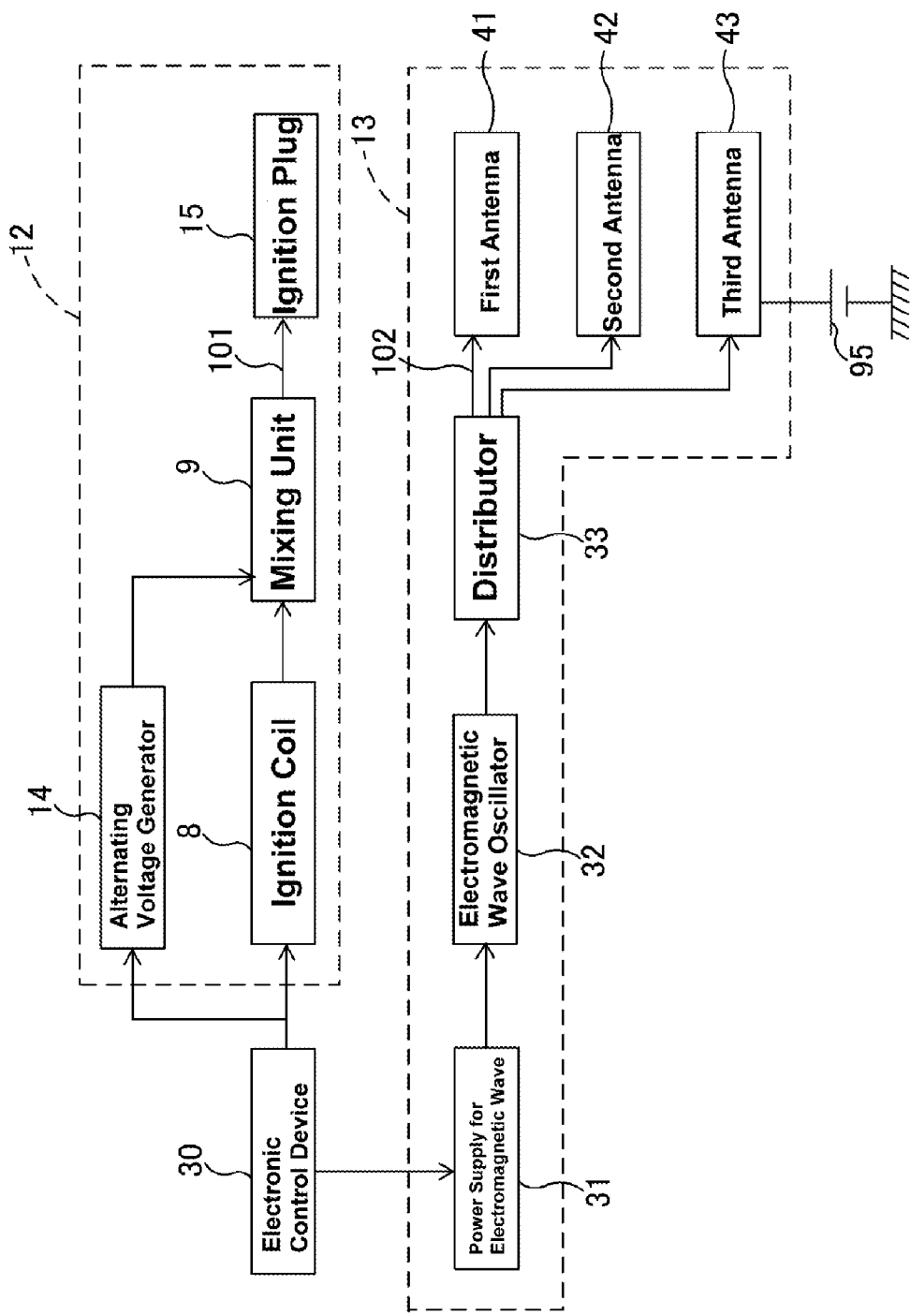
FIG. 18 is a block diagram of an electromagnetic wave emission device, which a voltage application part is connected to, and the like according to the tenth modified example of the embodiment.

According to the tenth modified example, while the antenna 43 is emitting the microwave after the fuel air mixture is ignited, a positive high voltage may be applied to the antenna 43 so that a time series variation of a voltage value of the antenna 43 embedded in the gasket 18 should conform with a waveform shown in FIG. 17. As shown in FIG. 18, a voltage application part 95 (a direct current power supply) is connected to the antenna 43. The positive voltage (Vd) applied to the antenna 43 is set to a value sufficient to attract the propagating flame (for example, several kilovolts).

The voltage application part 95 applies the positive high voltage to the antenna 43 while the antenna 43 is emitting the microwave. In the combustion chamber 20, a positive electric field is created due to the application of the positive voltage, and the positive electric field attracts electrons and the like in the ignited flame toward a side of the antenna 43 as a result of this, the propagation speed of the flame is accelerated.

Figure 19:
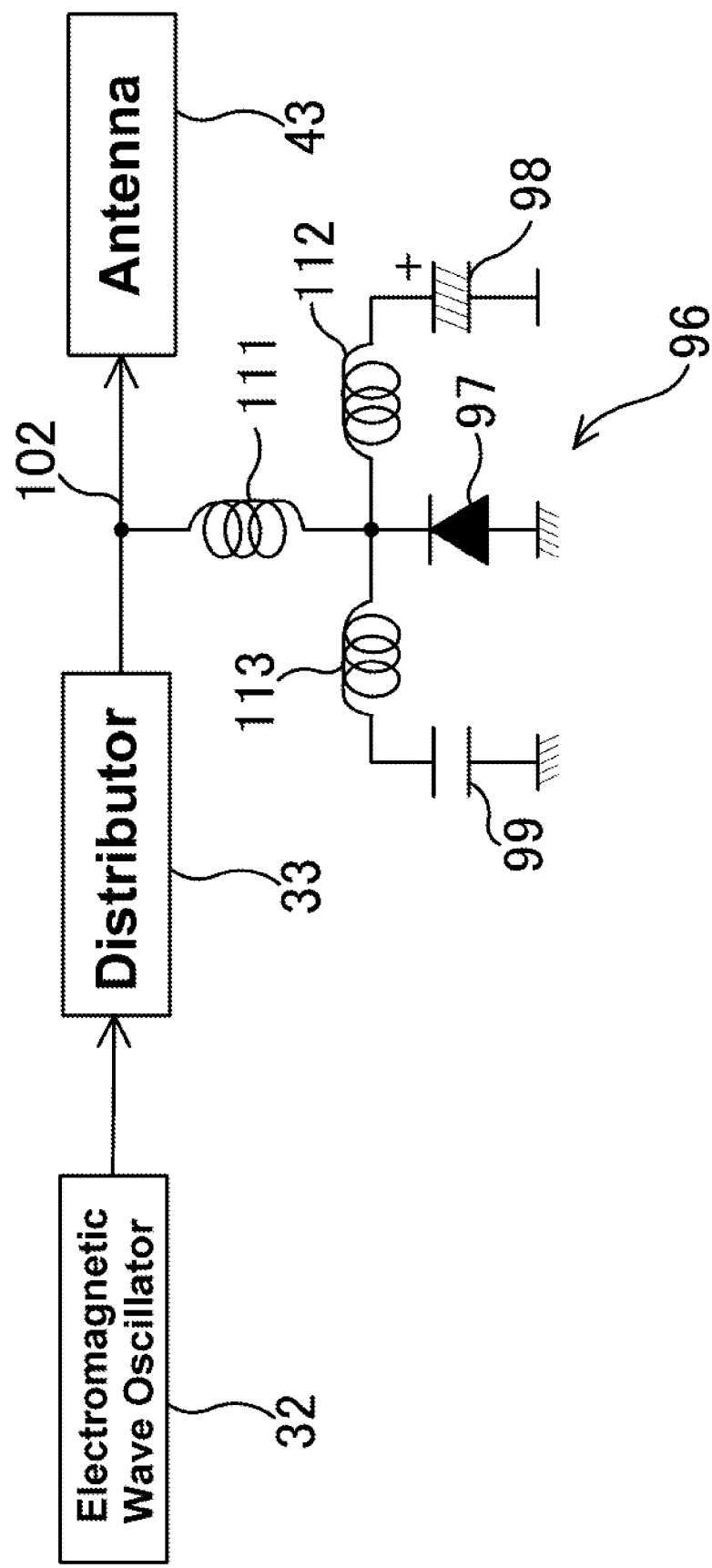
FIG. 19 is a block diagram of a relevant part of the electromagnetic wave emission device, which a boost circuit is connected to, according to the tenth modified example of the embodiment.

Alternatively, the voltage application part 95 may be configured such that the energy of the microwave oscillated by the electromagnetic wave oscillator 32 is stored in a capacitor 98 (an electrolytic capacitor), and the capacitor 98 that has stored the energy applies a positive voltage to the antenna 43. In the voltage application part 95, as shown in FIG. 19, an inductor 111 is provided in a connecting line extending from the second transmission line 102, and the connecting line branches into three branch lines. Each branch line is grounded. The three branch lines are configured by a first line provided with a diode 97, a second line provided with an inductor 112 and an electrolytic capacitor 98 serially connected with each other, and a third line provided with an inductor 113 and an electrolytic capacitor 99, which is less in capacitance than the electrolytic capacitor 98, serially connected with each other. The second line functions as a high pass filter and a direct current charging circuit. A circuit from a connecting end of the connecting line to a grounding end of the third line (a circuit provided with the inductors 111 and 113 and the capacitor 99) is configured to have a length that does not influence the microwave on the second transmission line 102.

Figure 20:
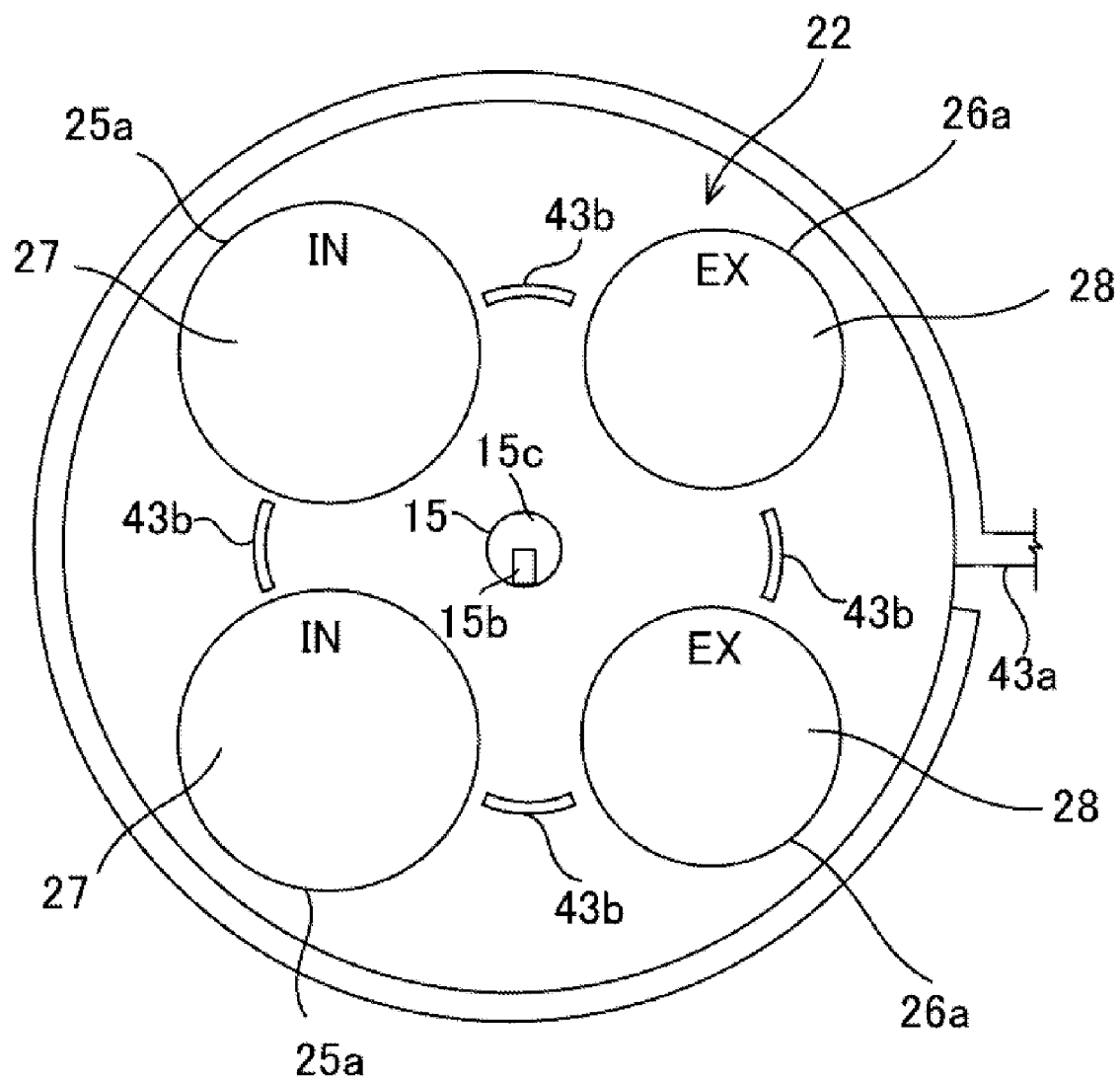
FIG. 20 is a front view of a ceiling surface of a combustion chamber of an internal combustion engine according to the tenth modified example of the embodiment.

The antenna 43 may be a rod-shaped antenna as shown in FIGS. 4 and 6, or may be an antenna 43a in a shape of a letter C as shown in FIG. 20. As shown in FIG. 20, it suffices as long as an antenna 43b is arranged at a location where the propagating flame passes through. The antenna (e) 43b may be arranged not in the gasket 18 but on the cylinder head 22.

Furthermore, the voltage application part 95 may apply the positive high voltage to the antenna 43 while the flame is propagating. Furthermore, the voltage application part 95 may apply a high alternating voltage to the antenna 43 while the antenna 43 is emitting the microwave. In this case, the voltage application part 95 is configured by an alternating current power supply.

Eleventh Modified Example of Embodiment

Figure 21:
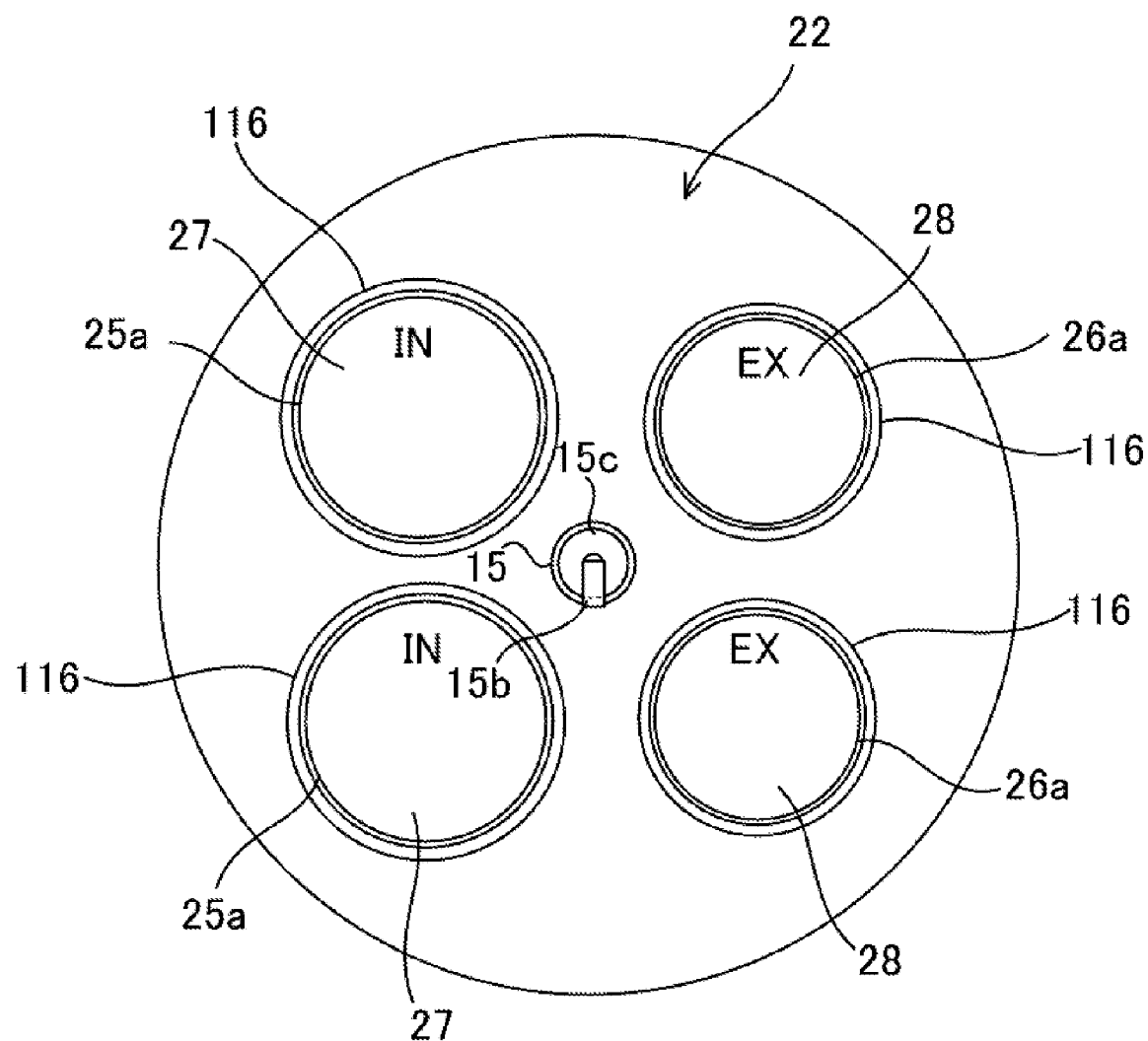
FIG. 21 is a front view of a ceiling surface of a combustion chamber of an internal combustion engine according to an eleventh modified example of the embodiment.

According to the eleventh modified example, as shown in FIG. 21, ring shaped emission antennae 116 are provided around the opening parts 25a of the intake ports 25 and around the opening parts 26a of the exhaust ports 26 on the cylinder head 22. The emission antennae 116 may be provided merely around the opening parts 25a of the intake ports 25.

Twelfth Modified Example of Embodiment

Figure 22:
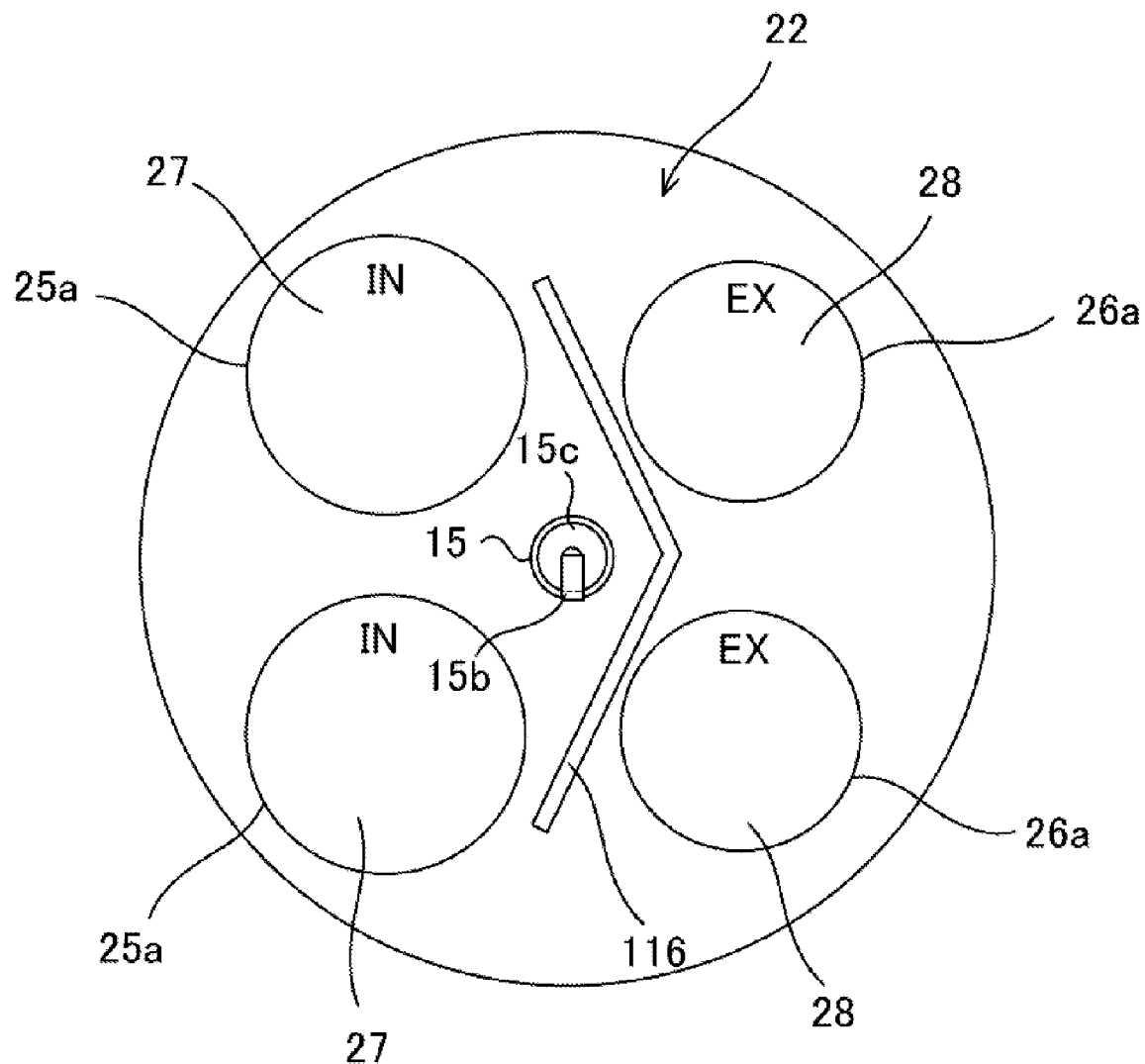
FIG. 22 is a front view of a ceiling surface of a combustion chamber of an internal combustion engine according to a twelfth modified example of the embodiment.

According to the twelfth modified example, as shown in FIG. 22, a half wavelength dipole emission antenna 116 is provided on the cylinder head 22.

The emission antenna 116 is bent in the vicinity of the ignition plug 15 in a region between the opening parts 26a of the two exhaust ports 26. The emission antenna 116 includes straight line parts extending in two directions from a bending point. Each straight line part passes through a region between the opening part 25a of the intake port 25 and the opening part 26a of the exhaust port 26.

According to the twelfth modified example, it is possible to intensify an electric field on an intake side intervening between the straight line parts of the emission antenna 116 when a microwave is emitted from the emission antenna 116. Accordingly, it is possible to improve the propagation speed of the flame on the intake side where the flame propagation is slow.

In place of the half wavelength dipole emission antenna 116 shown in FIG. 22, a half wavelength dipole emission antenna 116 may be provided in a region between the opening parts 25a and 26a of the intake ports 25 and the exhaust ports 26 of the cylinder head 22.

Thirteenth Modified Example of Embodiment

Figure 23:
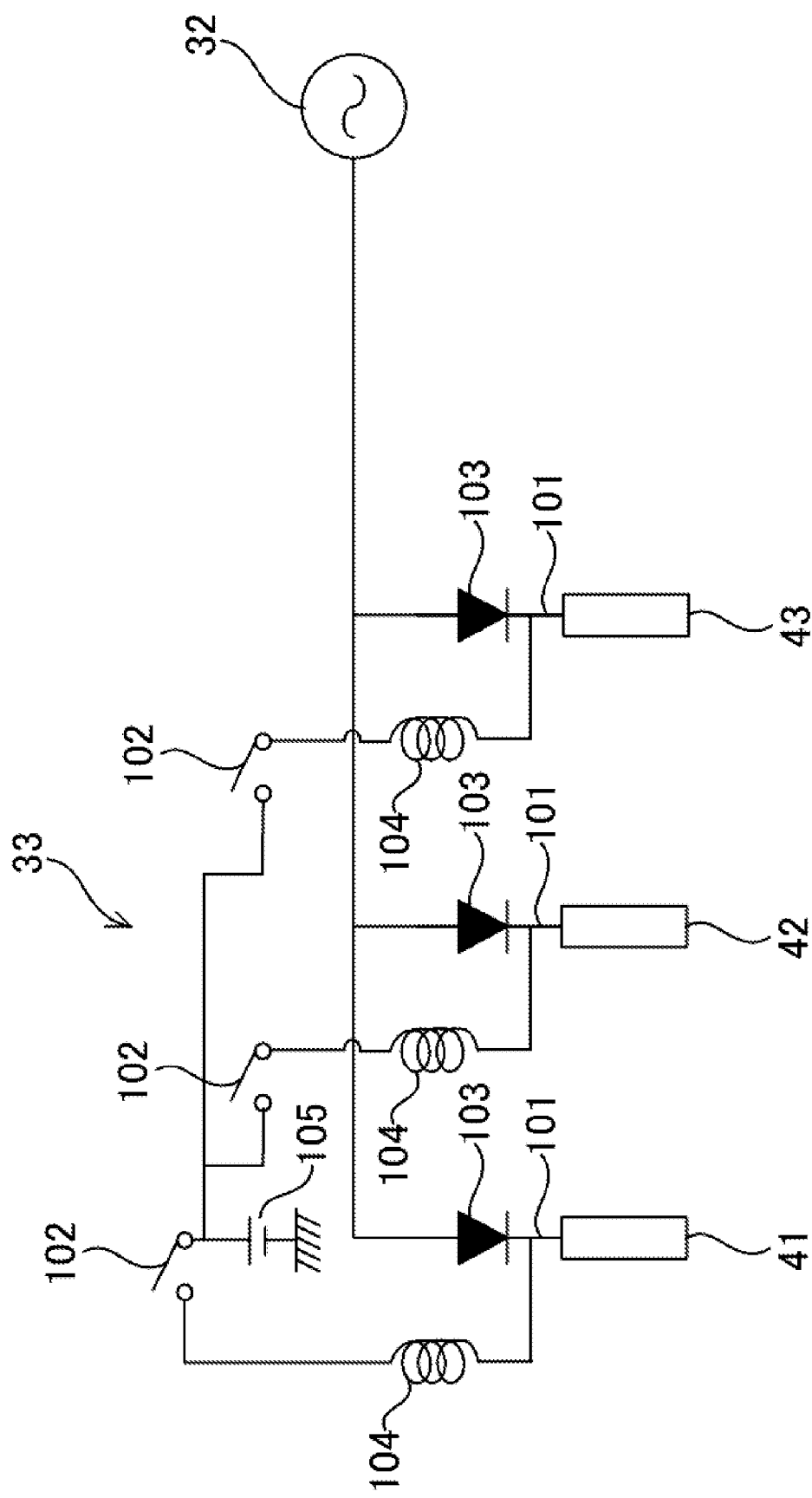
FIG. 23 is a schematic configuration diagram of a distributor according to a thirteenth modified example of the embodiment.

According to the thirteenth modified example, a distributor 33 shown in FIG. 23 is employed. In the electromagnetic wave emission device 13, a transmission line extending from the electromagnetic wave oscillator 32 is branched to branch parts 101 respectively corresponding to the emission antennae 41 to 43. The distributor 33 controls switch elements 102 respectively connected to the plurality of branch parts 101, corresponding to the respective emission antennae 41 to 43, of the transmission line of the microwave. This means that when a voltage is applied to the branch parts 101 except for one of the branch parts 101, one of the emission antennae 41 to 43, which the one of the branch parts 101, which the voltage is not applied to, is connected to, is supplied with the microwave. In FIG. 23, diodes are designated by 103, coils by 104, and a direct current power supply by 105.

According to the thirteenth modified example, the emission antennae 41 to 43 are provided for each combustion chamber 20. Each of the emission antennae 41 to 43 is mounted in the gasket 18 configured by insulating material such as ceramic. Here, the gasket 18 is provided with the distributor 33 along with a part of the transmission line of the microwave.

Figure 24:
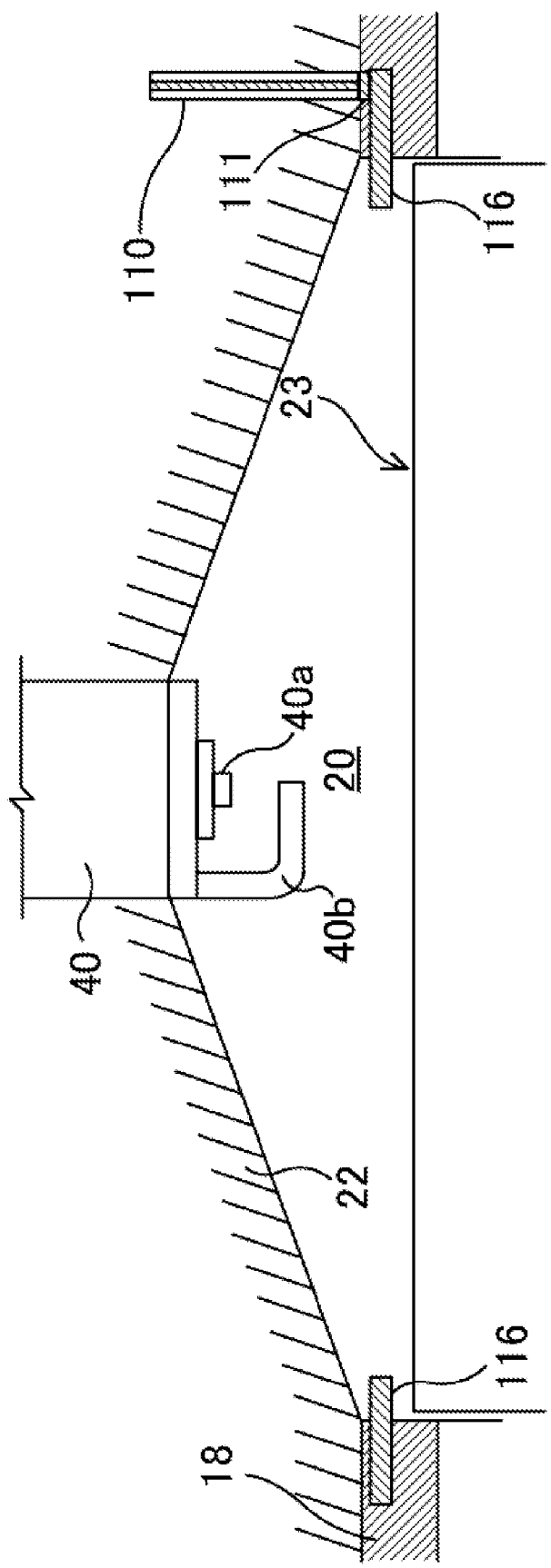
FIG. 24 is a schematic configuration diagram of a relevant part of an internal combustion engine according to the thirteenth modified example of the embodiment.

In a case in which an emission antenna 116 is provided to the gasket 18, as shown in FIG. 24, a transmission line 110 of the microwave extends from an outer surface of the internal combustion engine main body 11 in an axial direction of the piston 23 and is connected to an input terminal 111 of the emission antenna 116 in the gasket 18. The emission antenna 116 is formed in a shape of a ring or a letter C extending along an inner periphery of the gasket 18.

For example, in a case in which a fastening hole is provided for fastening the cylinder block 21 to the cylinder head 22, a transmission line 110 of the microwave may be mounted utilizing a fastening member that is threaded into the fastening hole. The fastening member is configured by ceramic, inside of which a stripline is embedded.

Fourteenth Modified Example of Embodiment

Figure 25:
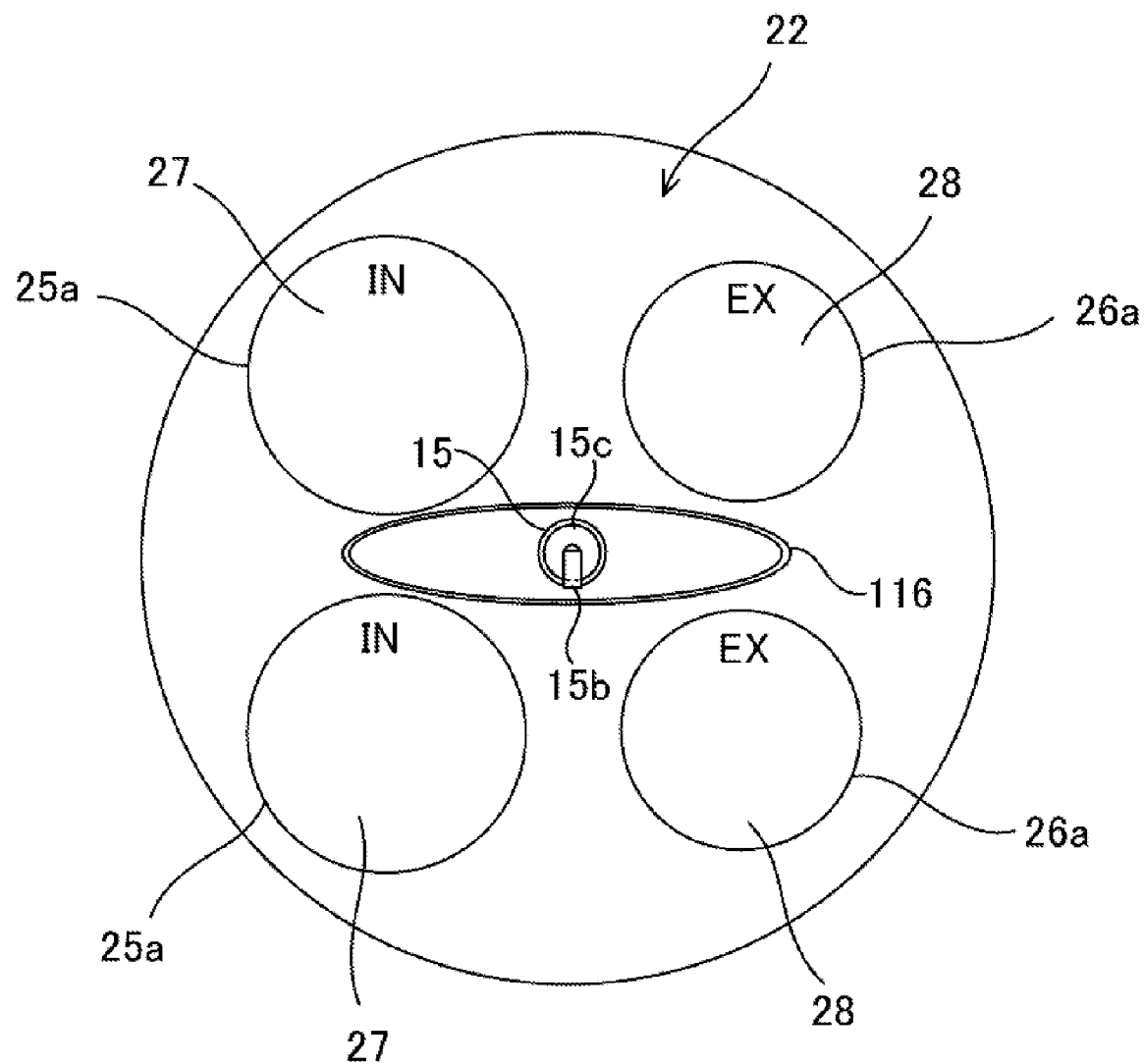
FIG. 25 is a front view of a ceiling surface of a combustion chamber of an internal combustion engine according to a fourteenth modified example of the embodiment.

According to the fourteenth modified example, as shown in FIG. 25, an emission antenna 116 provided on the ceiling surface of the combustion chamber 20 is formed in an elliptical shape. The emission antenna 116 is arranged from a region between the opening parts 25a of the two intake ports 25 over to a region between the opening parts 26a of the two exhaust ports 26 so as to surround the tip end part 15c of the ignition plug 15. Here, a center of the elliptical shape of the emission antenna 116 may be shifted toward the intake side.

Fifteenth Modified Example of Embodiment

Figure 26:
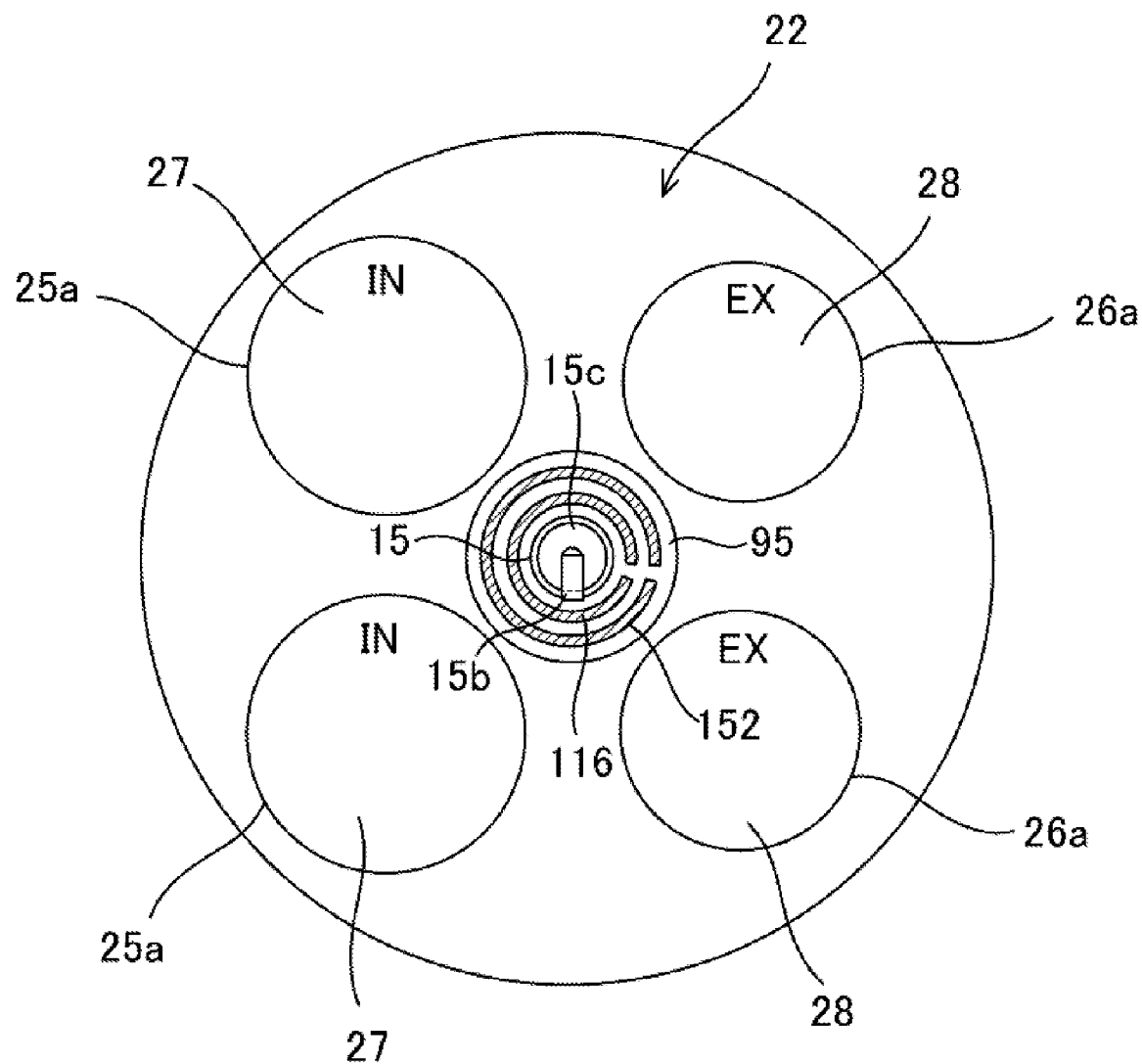
FIG. 26 is a front view of a ceiling surface of a combustion chamber of an internal combustion engine according to a fifteenth modified example of the embodiment.

According to the fifteenth modified example, in addition to the configuration of the third modified example, as shown in FIG. 26, a receiving antenna 152 for resonating with the microwave emitted from an emission antenna 116 is provided on the ceiling surface of the combustion chamber 20. The receiving antenna 152 is formed in a shape of a letter C slightly larger than the emission antenna 116. The receiving antenna 152 may be formed in a shape of a ring.

According to the fifteenth modified example, the emission antenna 116 emits a microwave to the combustion chamber 20 immediately after the fuel air mixture is ignited. In the combustion chamber 20, a strong electric field region is formed in the vicinity of the emission antenna 116 and in the vicinity of the receiving antenna 152. The flame passing through locations of the emission antenna 116 and the receiving antenna 152 receives the energy of an electric field of the strong electric field region and increases in propagation speed.

If the energy of the microwave is sufficiently strong, microwave plasma is generated in the strong electric field region. In a region where the microwave plasma is generated, active species such as OH radical are generated. The flame passing through the strong electric field region increases in propagation speed owing to the active species.

Sixteenth Modified Example of Embodiment

Figure 27:
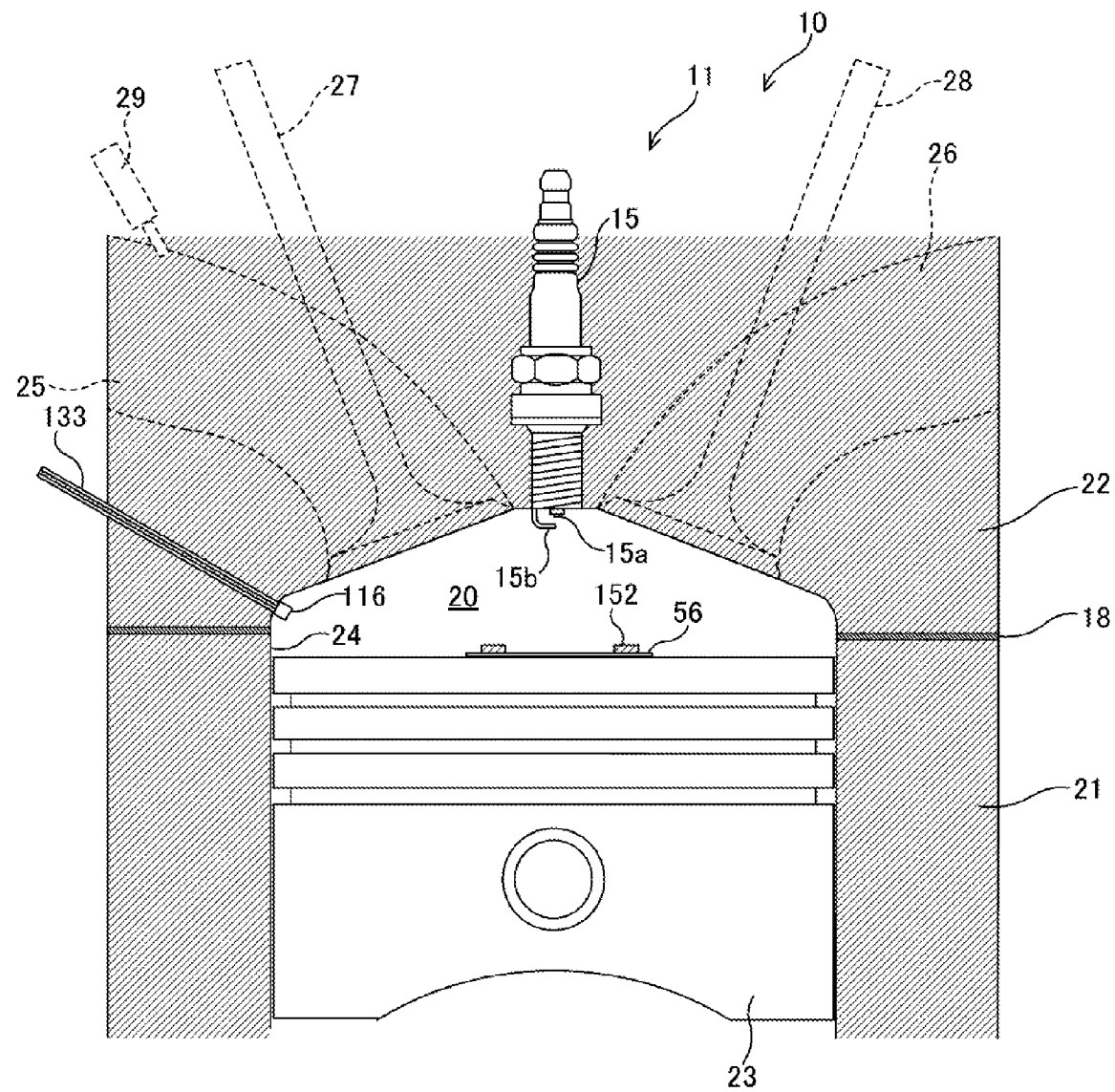
FIG. 27 is a schematic configuration diagram of an internal combustion engine according to a sixteenth modified example of the embodiment.

According to the sixteenth modified example, unlike the embodiment describe above, as shown in FIG. 27, only one emission antenna 116 is provided in each combustion chamber 20. The emission antenna 116 is located in the vicinity of the outer periphery of the combustion chamber 20. The emission antenna 116 is arranged in a region between the two intake side opening parts 25a on the ceiling surface of the combustion chamber 20. The emission antenna 116 is connected to an output terminal of the distributor 33 via a transmission line 133.

Furthermore, a receiving antenna 152 is provided on a top part of the piston 23 for resonating with the microwave emitted from the emission antenna 116. The receiving antenna 152 is located in the vicinity of a center of the top part of the piston 23. Although the receiving antenna 152 is singularly provided, two or more receiving antennae 152 may be provided. The receiving antenna 152 is formed in a shape of a ring.

According to the sixteenth modified example, the emission antenna 116 emits a microwave during the ignition operation. Then, the microwave intensifies an electric field formed at the discharge gap by the electric energy supplied to the central electrode 15a from the alternating voltage generator 14. Accordingly, it is possible to further stably ignite the lean fuel air mixture.

Figure 28:
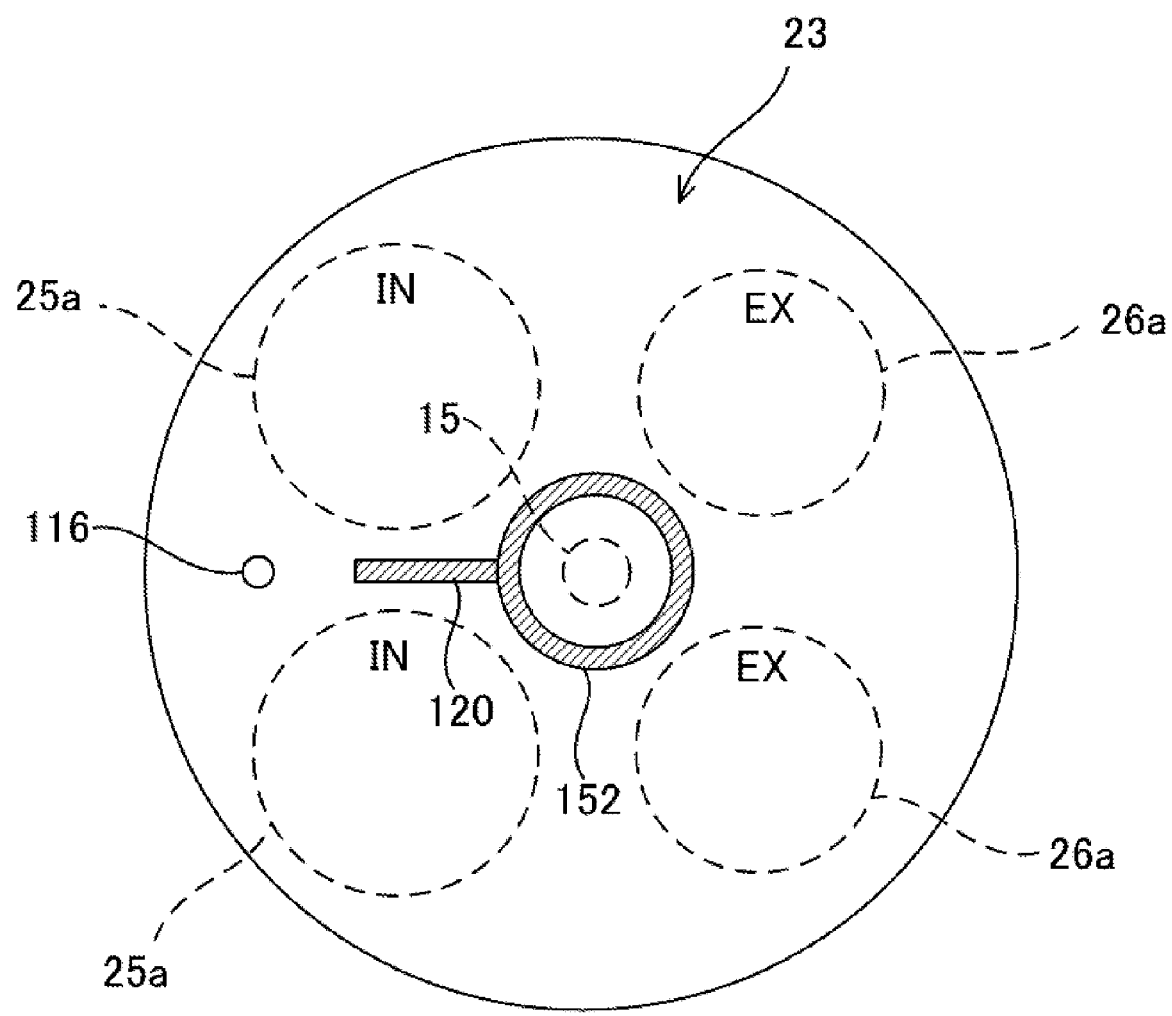
FIG. 28 is a front view of a top surface of a piston according to the sixteenth modified example of the embodiment.

As shown in FIG. 28, a conductor 120 may be provided on the top part of the piston 23 in such a manner that the conductor 120 is connected to the receiving antenna 152 at an outer periphery thereof and extends toward a side of the emission antenna 116. Here, the receiving antenna 152 may be formed in a shape extending from the side of the emission antenna 116 downwardly of the ignition plug 15 (such as a shape of a droplet).

Other Embodiments

The embodiment described above may also be configured as follows.

In the embodiment described above, the internal combustion engine 10 may be a direct injection type engine. For example, when the piston 23 is at a location immediately before the compression top dead center, the injector 29 forms a region having a high concentration of fuel at the tip end part 15c of the ignition plug 15. Furthermore, in the embodiment described above, the internal combustion engine 10 may be a Wankel rotary engine. In this case, the antenna is embedded in a rotor housing.

Furthermore, in the embodiment described above, the ignition plug may be of a plasma jet type. At the tip end part 15c of the ignition plug 15, a small space is formed that constitutes a part of the combustion chamber 20. A continuous voltage or a repeated voltage pulse is applied to the ignition plug 15 so as to generate high intensity plasma in the small space, and the plasma is ejected toward the combustion chamber outside of the small space by the high intensity plasma.

Furthermore, in the embodiment described above, the high intensity plasma 36 may be generated by supplying the ignition plug 15 with a large current stored in a capacitor after momentarily applying a high voltage pulse from the ignition coil to the ignition plug 15. A voltage is continuously applied to the ignition plug 15.

Furthermore, in the embodiment described above, the propagation of the flame surface may be promoted from behind by emitting the microwave to a region which the flame surface has passed through and generating the microwave plasma. For example, even after the flame surface has passed through between the second antenna 42 and the third antenna 43, the second antenna 42 may continue to emit the microwave so as to maintain the microwave plasma in the vicinity of the emitting end of the second antenna 42. In this case, temperature rises owing to the microwave in the region which the flame has passed through, and accordingly, oxidation reaction of the fuel air mixture is promoted. Furthermore, since pressure rises behind the flame surface, flame propagation is promoted.

Furthermore, in the embodiment described above, the antenna 41 for irradiating the high intensity plasma 36 with the microwave may be embedded in the ignition plug 15. In this case, the ignition plug 15 is provided with a cylindrical metal housing in which a coaxial line is accommodated and an insulator is fitted therein. The antenna 41 is connected to a terminal end of the coaxial line and is protruded from a tip end surface of the ignition plug 15. A tip end side of the antenna 41 is bent in a shape of an arc so as to surround the discharge gap.

Furthermore, in the embodiment described above, the ignition device 12 may emit a laser to the combustion chamber 20 so as to ignite the fuel air mixture more forcefully than the spark discharge.

Furthermore, in the embodiment described above, the ignition device 12 may not be provided with the alternating voltage generator 14 but always employ the electromagnetic wave oscillator 32 so as to expand the discharge plasma byway of the microwave, thereby generating the high intensity plasma. In this case, the distributor 33 switches the supply destination of the microwave from among the central electrode 15a and the antennae 41 to 43.

Furthermore, in the embodiment described above, the emitting position of the microwave on each of the antennae 41 to 43 may be covered by an insulator or dielectric material.

INDUSTRIAL APPLICABILITY

The present invention is useful in relation to an internal combustion engine that ignites fuel air mixture more forcefully than a spark discharge.

EXPLANATION OF REFERENCE NUMERALS

10 Internal Combustion Engine
11 Internal Combustion Engine Main Body
12 Ignition Device
13 Electromagnetic Wave Emission Device
20 Combustion Chamber
32 Electromagnetic Wave Oscillator
41 First Antenna
42 Second Antenna
43 Third Antenna

What is claimed is:
1. An internal combustion engine comprising:
an internal combustion engine main body formed with a combustion chamber; and an ignition device that ignites fuel air mixture in the combustion chamber, the ignition device comprising (i) an ignition plug that includes an ignition side electrode exposed toward the combustion chamber to generate a spark discharge, and (ii) a plasma generation part that supplies electric energy to the spark discharge at the ignition side electrode, thereby generating high intensity plasma from the spark discharge, wherein the internal combustion engine repeatedly carries out a combustion cycle, in which the ignition device ignites the fuel air mixture so as to combust the fuel air mixture, the internal combustion engine further comprises an electromagnetic wave emission device provided with an electromagnetic wave oscillator that oscillates an electromagnetic wave, and an antenna that emits the electromagnetic wave supplied from the electromagnetic wave oscillator to the combustion chamber, the electromagnetic wave emission device emits the electromagnetic wave from the antenna so as to create an electric field for accelerating a propagation speed of a flame, and the internal combustion engine further comprises:
- a first transmission line for supplying the electric energy outputted from the plasma generation part to the ignition side electrode;
- a second transmission line for supplying the electromagnetic wave outputted from the electromagnetic wave oscillator to the antenna, the first transmission line and the second transmission line being provided separately from each other;
- a switchable transmission line for supplying the electromagnetic wave outputted from the electromagnetic wave oscillator to the ignition side electrode; and
- a switching unit that is switchable between an ordinary state, in which the electromagnetic wave outputted from the electromagnetic wave oscillator is supplied to the antenna via the second transmission line, and a switched state, in which the electromagnetic wave outputted from the electromagnetic wave oscillator is supplied to the ignition side electrode via the switchable transmission line.

2. The internal combustion engine according to claim 1, wherein the ignition device supplies a high frequency wave to the combustion chamber so as to generate a high intensity plasma, which is more intense than the spark discharge, and the electromagnetic wave oscillator outputs the electromagnetic wave higher in frequency than the high frequency wave supplied from the ignition device.

3. The internal combustion engine according to claim 2, wherein the high frequency wave outputted from the ignition device is configured to have a frequency that can create an induction electric field in the combustion chamber, and the electromagnetic wave outputted from the electromagnetic wave oscillator is configured to have a frequency that can create a radiation electric field in the combustion chamber.

4. The internal combustion engine according to claim 1, wherein the ignition device is provided with a high voltage pulse application part that causes the spark discharge by applying a high voltage pulse to the ignition side electrode, and is adapted to enlarge discharge plasma, which has been generated due to the spark discharge, by the electric energy outputted from the plasma generation part so as to generate the high intensity plasma.

5. The internal combustion engine according to claim 1, wherein the electromagnetic wave emission device emits the electromagnetic wave from the antenna while the high intensity plasma is present so as to supply the high intensity plasma with energy of the electromagnetic wave.

6. The internal combustion engine according to claim 5, wherein the high intensity plasma generated by the ignition device is drifted by a gas flow in the combustion chamber, and the electromagnetic wave emission device forms a strong electric field region, which has an intense electric field in the combustion chamber, at a location where the high intensity plasma, which has been drifted by the gas flow, is present.

7. The internal combustion engine according to claim 5, wherein the high intensity plasma generated by the ignition device is drifted by a gas flow in the combustion chamber, and the electromagnetic wave emission device forms a strong electric field region, which has an electric field relatively strong in intensity in the combustion chamber, in the vicinity of a location where the high intensity plasma, which has been drifted by the gas flow, is present.

8. The internal combustion engine according to claim 7, wherein the electromagnetic wave emission device forms the strong electric field region on a downstream side in a direction which the high intensity plasma is drifted to.

9. The internal combustion engine according to claim 1, wherein the electromagnetic wave emission device emits the electromagnetic wave from the antenna after the fuel air mixture is ignited, thereby creating an electric field for accelerating the propagation speed of the flame.

10. The internal combustion engine according to claim 9, wherein the electromagnetic wave emission device emits the electromagnetic wave from the antenna after the fuel air mixture is ignited, thereby creating an electric field for attracting the flame in a propagation direction of the flame.

11. The internal combustion engine according to claim 10, wherein a cylindrical shaped cylinder partitions the combustion chamber and the ignition device ignites the fuel air mixture at a central part of the combustion chamber in the internal combustion engine main body, while the antenna is arranged on an outer peripheral side of the combustion chamber.

12. The internal combustion engine according to claim 9, wherein the internal combustion engine comprises a voltage application part that applies a positive voltage or alternating voltage to the antenna while the antenna is emitting the electromagnetic wave.

13. The internal combustion engine according to claim 1, wherein the antenna is arranged in the vicinity of the ignition plug.

14. The internal combustion engine according to claim 13, wherein the antenna extends outwardly of and along an outer periphery of a tip end part of the ignition plug.

15. The internal combustion engine according to claim 14, wherein
the antenna is formed in a shape of a ring or a letter C.

16. The internal combustion engine according to claim 1, wherein
the internal combustion engine further comprises:
a failure detection unit that detects a failure in a generation operation in which the plasma generation part generates the high intensity plasma, and
a control unit that, in a case in which the failure detection unit has detected a failure in the generation operation, causes the electromagnetic wave oscillator to output the electromagnetic wave at an ignition timing of igniting the fuel air mixture, and causes the switching unit to be set to the switched state at the ignition timing.

17. The internal combustion engine according to claim 1, wherein
the electromagnetic wave emission device causes the electromagnetic wave oscillator to output the electromagnetic wave at the ignition timing of igniting the fuel air mixture and during a propagation period of the flame for each combustion cycle in the combustion chamber, and
the switching unit is set to the switched state at the ignition timing, and then is set to the ordinary state during the propagation period of the flame for each combustion cycle in the combustion chamber.

18. The internal combustion engine according to claim 4, wherein
the internal combustion engine further comprises a control unit that sets the high frequency wave outputted from the ignition device to have a frequency that can create an induction electric field in the combustion chamber,
sets the electromagnetic wave outputted from the electromagnetic wave oscillator to have a frequency that can create a radiation electric field in the combustion chamber, and
causes the electric energy outputted from the plasma generation part to be supplied to the ignition side electrode of the ignition device, and while, on the other hand, if a gas flow rate of the intake port connected to the combustion chamber exceeds a predetermined flow rate, causes the electromagnetic wave emission device to emit the electromagnetic wave from the antenna at a timing when the ignition device ignites the fuel air mixture.

* * * * *